(12) United States Patent
Schmidt et al.

(10) Patent No.: US 9,854,312 B2
(45) Date of Patent: Dec. 26, 2017

(54) PROGRAM SHORTCUTS

(71) Applicant: TiVo Solutions Inc., San Carlos, CA (US)

(72) Inventors: Margret Schmidt, Redwood City, CA (US); Alex Liston, Menlo Park, CA (US); Shelly Glennon, San Jose, CA (US)

(73) Assignee: TiVo Solutions Inc., San Carlos, CA (US)

( * ) Notice: Subject to any disclaimer, the term of this patent is extended or adjusted under 35 U.S.C. 154(b) by 430 days.

(21) Appl. No.: 14/074,253

(22) Filed: Nov. 7, 2013

(65) Prior Publication Data

US 2014/0064709 A1 Mar. 6, 2014

Related U.S. Application Data

(63) Continuation of application No. 12/433,831, filed on Apr. 30, 2009, now Pat. No. 9,270,963.

(51) Int. Cl.
*H04N 21/472* (2011.01)
*H04N 21/4147* (2011.01)
(Continued)

(52) U.S. Cl.
CPC ......... *H04N 21/47217* (2013.01); *H04N 5/76* (2013.01); *H04N 9/79* (2013.01);
(Continued)

(58) Field of Classification Search
CPC ........... H04N 21/4147; H04N 21/4334; H04N 21/47202; H04N 21/47214; H04N 21/482;
(Continued)

(56) References Cited

U.S. PATENT DOCUMENTS

| 5,801,787 | A | | 9/1998 | Schein et al. |
| 5,805,235 | A | * | 9/1998 | Bedard ............... H04N 5/44543 348/564 |

(Continued)

FOREIGN PATENT DOCUMENTS

| CN | 101351797 | 1/2009 |
| EP | 1274022 | 8/2003 |

(Continued)

OTHER PUBLICATIONS

U.S. Appl. No. 12/433,831, Notice of Allowance dated Sep. 29, 2015.

(Continued)

*Primary Examiner* — Pinkal R Chokshi
(74) *Attorney, Agent, or Firm* — Haley Guiliano LLP

(57) ABSTRACT

Techniques are described that allow DVR users to create program shortcuts to different types of media content from content providers. A program shortcut comprises a reference to another media content. A user may generate a shortcut so that the user may easily find and return to media content without performing a new search. In addition, techniques may be used to automatically generate program shortcuts for a user based at least in part to user-indicated preferences or actions. Shortcuts may be generated to media content that is related to a preferred genre or media type specified by a user. Shortcuts may also be generated to content that is determined to be similar to content that is often viewed or recorded by the user.

23 Claims, 26 Drawing Sheets

(51) Int. Cl.
| | |
|---|---|
| *H04N 5/76* | (2006.01) |
| *H04N 21/433* | (2011.01) |
| *H04N 21/4335* | (2011.01) |
| *H04N 21/482* | (2011.01) |
| *H04N 21/845* | (2011.01) |
| *H04N 9/79* | (2006.01) |
| *H04N 9/82* | (2006.01) |

(52) U.S. Cl.
CPC ..... *H04N 21/4147* (2013.01); *H04N 21/4334* (2013.01); *H04N 21/4335* (2013.01); *H04N 21/47202* (2013.01); *H04N 21/47214* (2013.01); *H04N 21/482* (2013.01); *H04N 21/4826* (2013.01); *H04N 21/4828* (2013.01); *H04N 21/8455* (2013.01); *H04N 9/8205* (2013.01)

(58) Field of Classification Search
CPC ........... H04N 21/4828; H04N 21/8455; H04N 21/47217; H04N 21/4826
See application file for complete search history.

(56) References Cited

U.S. PATENT DOCUMENTS

| | | | |
|---|---|---|---|
| 5,812,124 A | 9/1998 | Eick et al. | |
| 6,005,565 A | 12/1999 | Legall et al. | |
| 6,008,803 A | 12/1999 | Rowe et al. | |
| 6,097,878 A | 8/2000 | Saib | |
| 6,100,890 A | 8/2000 | Bates et al. | |
| 7,167,901 B1* | 1/2007 | Beadle | G06F 17/30867 |
| | | | 707/999.003 |
| 7,260,564 B1 | 8/2007 | Lynn et al. | |
| 7,665,109 B2* | 2/2010 | Matthews, III | H04N 5/44543 |
| | | | 715/760 |
| 7,712,125 B2 | 5/2010 | Herigstad et al. | |
| 7,721,309 B2 | 5/2010 | Nishikawa et al. | |
| 8,010,532 B2 | 8/2011 | Chi et al. | |
| 8,380,566 B2* | 2/2013 | Smith | G06Q 30/02 |
| | | | 705/14.1 |
| 8,577,868 B1 | 11/2013 | Zamir et al. | |
| 8,667,521 B2* | 3/2014 | Vandermolen | H04H 60/33 |
| | | | 386/241 |
| 8,818,179 B1* | 8/2014 | Barton | H04N 21/25891 |
| | | | 386/297 |
| 8,832,742 B2 | 9/2014 | Rasanen et al. | |
| 8,856,833 B2 | 10/2014 | Conness et al. | |
| 9,270,963 B2 | 2/2016 | Schmidt et al. | |
| 2002/0069218 A1 | 6/2002 | Sull et al. | |
| 2002/0103867 A1* | 8/2002 | Schilter | G06Q 10/107 |
| | | | 709/206 |
| 2002/0174431 A1 | 11/2002 | Bowman et al. | |
| 2003/0028889 A1 | 2/2003 | McCoskey et al. | |
| 2003/0061610 A1 | 3/2003 | Errico | |
| 2003/0226147 A1 | 12/2003 | Richmond et al. | |
| 2004/0216160 A1 | 10/2004 | Lemmons et al. | |
| 2004/0239637 A1 | 12/2004 | Williams et al. | |
| 2005/0188408 A1 | 8/2005 | Wallis et al. | |
| 2006/0026572 A1 | 2/2006 | Srivastava | |
| 2007/0022438 A1 | 1/2007 | Arseneau et al. | |
| 2007/0033170 A1 | 2/2007 | Sull et al. | |
| 2007/0104456 A1 | 5/2007 | Craner | |
| 2007/0150930 A1* | 6/2007 | Koivisto | G06F 17/30884 |
| | | | 725/134 |
| 2007/0156627 A1* | 7/2007 | D'Alicandro | G06F 17/30884 |
| 2007/0157252 A1* | 7/2007 | Perez | G06Q 30/02 |
| | | | 725/61 |
| 2007/0162502 A1 | 7/2007 | Thomas et al. | |
| 2007/0180407 A1 | 8/2007 | Vahtola | |
| 2007/0204285 A1 | 8/2007 | Louw | |
| 2007/0239734 A1 | 10/2007 | Arellanes et al. | |
| 2007/0300261 A1 | 12/2007 | Barton et al. | |
| 2007/0300263 A1 | 12/2007 | Barton et al. | |
| 2008/0189266 A1* | 8/2008 | Cohen | G06F 17/30855 |
| 2008/0189743 A1* | 8/2008 | Ellis | H04N 7/163 |
| | | | 725/39 |
| 2009/0077598 A1 | 3/2009 | Watson et al. | |
| 2009/0087167 A1 | 4/2009 | Seisun et al. | |
| 2009/0235297 A1 | 9/2009 | Ferrone | |
| 2009/0249256 A1* | 10/2009 | Brzeski | G06F 17/2235 |
| | | | 715/847 |
| 2009/0276399 A1* | 11/2009 | Irmak | G06F 17/3089 |
| 2010/0030766 A1* | 2/2010 | Li | G06F 17/30616 |
| | | | 707/749 |
| 2010/0050128 A1 | 2/2010 | Chiang et al. | |
| 2010/0154012 A1 | 6/2010 | Clavenna et al. | |
| 2010/0199219 A1 | 8/2010 | Poniatowski et al. | |
| 2010/0281506 A1 | 11/2010 | Schmidt et al. | |
| 2015/0134710 A1* | 5/2015 | Yoon | G06F 17/30038 |
| | | | 707/812 |
| 2016/0134940 A1 | 5/2016 | Schmidt et al. | |

FOREIGN PATENT DOCUMENTS

| | | |
|---|---|---|
| GB | 2409737 | 6/2005 |
| JP | 2006-166284 | 6/2006 |
| JP | 2006166284 | 6/2006 |
| JP | 2006-311118 | 11/2006 |
| JP | 2008513887 | 5/2008 |
| JP | 2012-580456 | 6/2013 |
| WO | WO 97/37490 | 10/1997 |
| WO | WO 99/60790 | 11/1999 |
| WO | WO 2006/031864 | 3/2006 |
| WO | WO 2008/016611 | 2/2008 |
| WO | WO 2008/112281 A2 | 9/2008 |
| WO | WO2009/032243 | 3/2009 |

OTHER PUBLICATIONS

Chinese Patent Office, Application No. 200980159056.9, Foreign Office Action dated Sep. 17, 2015.
Chinese Patent Office, Application No. 200980159056.9, Pending Claims as of Sep. 17, 2015.
Chinese Patent Office, Application No. 200980159056.9, Foreign Office Action dated Jun. 24, 2014.
Chinese Patent Office, Application No. 200980159056.9, Pending Claims as of Jun. 24, 2014.
European Search Report received in Application No. 09844193.4 dated Dec. 10, 2012 (8 pages).
Current Claims received in European Application No. 09844193.4 dated Dec. 2012 (3 pages).
Choinski, E., "High Marks for SmartMarks (A New Bookmarks Organizer from Netscape): A Review Article"; XP-000865762; Internet References Services Quarterly vol. 1(3) 1996 (8 pages).
IBM Technical Disclosure Bulletin, "User Interface Shortcut"; XP 000120530; vol. 33, No. 3A, Aug. 1990 (2 pages).
Australian Office Action received in 2009345115 dated Feb. 11, 2013 (4 pages).
Australian Current Claims dated Feb. 2013 (4 pages).
Singapore Office Action received in Application No. 201107606-4 dated Aug. 9, 2012 (11 pages).
Singapore Current Claims of Application No. 201107606-4 dated Aug. 2012 (4 pages).
JP Office Action, JP Application No. 2012-580456 dated Jun. 11, 2013, 3 pages.
Claims from JP Application No. 2012-580456, dated Jun. 2013, 4 pages.
CA Office Action, CA Application No. 2,759,032 dated Oct. 8, 2013, 3 pages.
Claims from CA Application No. 2,759,032, dated Oct. 2013, 4 pages.
Chinese Patent Office, Application No. 200980159056.9, Foreign Office Action dated Jun. 10, 2015.
Chinese Patent Office, Application No. 200980159056.9, Pending Claims as of Jun. 10, 2015.
Japanese Patent Office, Application No. 2013-231239, Foreign Office Action dated Jul. 7, 2015.

(56) References Cited

OTHER PUBLICATIONS

Japanese Patent Office, Application No. 2013-231239, Pending Claims as of Jul. 7, 2015.
Japanese Patent Office, Application No. 2013-231239, Foreign Office Action dated Nov. 12, 2014.
Japanese Patent Office, Application No. 2013-231239, Pending Claims as of Nov. 12, 2014.
Chinese Patent Office, Application No. 200980159056.9, Foreign Office Action dated Dec. 4, 2014.
Chinese Patent Office, Application No. 200980159056.9, Pending Claims as of Dec. 4, 2014.
European Patent Office, Application No. 09844193.4, Foreign Office Action dated Mar. 8, 2016.
European Patent Office, Application No. 09844193.4, Pending Claims as of Mar. 8, 2016.

* cited by examiner

Now Playing List

| | | |
|---|---|---|
| ⊘ My Name is Earl | Thu | 4/29 |
| ○ The Office | Thu | 4/29 |
| ☐ Parents Television Council (3) | Thu | 4/29 |
| ☐ The Sopranos (2) | Tue | 4/27 |
| ☐ Rocketboom (6) | Sun | 4/25 |
| Poker (4) | Fri | 4/24 |
| Products (5) | Thu | 4/23 |
| Bookmarks | Thu | 4/23 |

Poker (4)

Poker: Learn From the Pros
Available to Download from Sports Illustrated: Top poker professionals explain the nuances of the game.

| | | |
|---|---|---|
| ⓘ Poker Superstars | Thu | 4/29 |
| ○ Casino Strip Poker | Thu | 4/29 |
| ○ Google: Poker Fun | Thu | 4/29 |
| (TiVo) 2003 World Series of Poker | Tue | 4/27 |
| (B) Poker: Learn from the Pros | | 410 > |

FIG. 4

Search

Philadelphia
Fired by his firm, a lawyer with AIDS fights back in court with help from his lawyer. (1993)

Dr. Phil

PHIL  510

| A | B | C | D | E |
| F | G | H | I | J |
| K | L | M | N | O |
| P | Q | R | S | T |
| U | V | W | X | Y |
| Z | CLR | SPC | DEL | 123 |

< Philadelphia  511  >

512

The Philadelphia Story

Phillies @ Cubs

HARTMAN, PHIL

The Real World

On Demand Program 600

Philadelphia
Fired by his firm, a lawyer with AIDS fights back in court with help from his lawyer. (1993)

Available through Thu 8/19
Press INFO for details

Buy & watch now ($3.99)
< Bookmark this program (no charge) >    610
If you like this, try: Erin Brockovich
More options

Bookmark This Program?

Philadelphia

Do you want to bookmark this On Demand program so that it appears in the Now Playing List? If so, please note:

- Bookmarking On Demand programs is free of charge and doesn't take up any disk space.
- If you decide to watch it, you'll be charged $3.99 for 24 hours of unlimited access.
- This program is only available through 8/19, so after that date, the bookmark will automatically be deleted.

Yes, add a bookmark in the Now Playing List    710

No, go back

FIG. 7

Now Playing List

On Demand (5) 910

| | | |
|---|---|---|
| ○ Desperate Housewives | Sun | 7/12 |
| ◻ The Simpsons (4) | Sun | 7/12 |
| Saturday Night Live | Sat | 7/11 |
| Unwrapped | Sat | 7/11 |
| ◻ Movies (3) | Fri | 7/10 |
| Lost | Tue | 7/8 |
| Monk | Fri | 7/5 |
| Gilmore Girls | Tue | 7/8 |

On Demand Bookmarks

Philadelphia
Fired by his firm, a lawyer with AIDS fights back in court with help from his lawyer. (1993)

| | | |
|---|---|---|
| < B Philadelphia | 1010 | $3.99 > |
| !  Spiderman 2 | 1020 | PAID |
| B Goodfellas | 1030 | $1.99 |
| B Raging Bull | 1040 | $1.99 |
| B X-Men | 1050 | $3.99 |

On Demand Program ($3.99) 1100

Philadelphia
Fired by his firm, a lawyer with AIDS fights back in court
with help from his lawyer. (1993)

Available through Thu 8/19
Press INFO for details

< Buy now ($3.99) > 1110
Delete this bookmark 1120
If you like this, try: Erin Brockovich 1130
More options 1140

Buy Now?

Philadelphia

If you buy this On Demand program for $3.99, you'll have unlimited access to it for only the next 24 hours.

After the 24-hour period expires, this bookmark will be automatically deleted.

< Yes, buy now ($3.99)  1210  >

No, go back

FIG. 12

Now Playing List ← 1400

| | | | |
|---|---|---|---|
| ① | My Name is Earl | Thu | 4/29 |
| ○ | The Office | Thu | 4/29 |
| ☐ | Parents Television Council (3) | Thu | 4/29 |
| ☐ | The Sopranos (2) | Tue | 4/27 |
| ☐ | Rocketboom (6) | Sun | 4/25 |
| ▦ | Poker (4) <u>1410</u> | Fri | 4/24 |
| ▦ | Products (5) | Thu | 4/23 |
| ▦ | Bookmarks <u>1412</u> | Thu | 4/23 |

FIG. 14

Request Confirmed

Sports Illustrated: "Poker: Learn from the Pros"
This program has been added to your TiVoCast To Do List.

The program will be kept until you delete it.

< ⊙ Press SELECT to continue

FIG. 16

Upcoming Program

L.A. Confidential
Policemen become immersed in corruption, scandal, politics and prostitution in 1950s Hollywood (CC, Stereo)

Tue 6/28 3:30am 550 HBO
Duration: 2:30
Rated R
Drama, Movies, Crime Drama
Press INFO for details Record this episode
Get a Season Pass
< View related collections >
Ⓥ The Usual Suspects
If you like this, try....
More options

FIG. 17

Group
Movies By EW (5)

L.A. Confidential
1997 **** Policemen become immersed in corruption, scandal, politics and prostitution in 1950s Hollywood (CC, Stereo)

| < | 2110 | | |
|---|---|---|---|
| Ⓑ L.A. Confidential | | Wed | 6/28 > |
| Ⓑ Friday Night Lights | | Sat | 7/1 |
| Ⓑ Austin Powers: International... | | Sun | 7/2 |
| Ⓑ Ghostbusters | | Sun | 7/2 |
| Ⓑ Clerks | | Thu | 7/6 |

FIG. 21

Upcoming Program
From Movies by EW

Friday Night Lights
(2004) *** A high-school football coach in Odessa, Texas, tries to lead his players to the state championship. (CC, Stereo)

Tue 6/28 3:30am 550 HBO
Duration: 2:30
Rated R
Drama, Movies, Crime Drama
Press INFO for details The Usual Suspects < Record this episode  2210 >
Get a Season Pass
If you like this, try...
More options

FIG. 22

PROGRAM SHORTCUTS

CROSS-REFERENCE TO RELATED APPLICATIONS, BENEFIT CLAIM

This application is a Continuation of U.S. patent application Ser. No. 12/433,831, filed Apr. 30, 2009, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application.

This application is also related is related to U.S. patent application Ser. No. 11/649,444, filed on Jan. 3, 2007, by James Barton, et al., entitled "Recommended Recording and Downloading Guides," which is hereby incorporated by reference for all purposes as if fully set forth herein.

FIELD OF THE INVENTION

The present invention relates to digital video recorders (DVRs).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the DVR to the consumer world has revolutionized the way viewers watch and record media content. DVRs record television programs on one or more volatile or non-volatile computer-readable storage devices that is capable of storing a large number of media content. Because DVRs are usually box-like in shape, and are often found sitting on top of the television sets to which they are connected, DVRs typically are included in the broad category of devices referred to herein as "set-top boxes." Much like Video Cassette Recorders (VCRs), DVRs may receive one or more media content signals (which may represent television programs, movies, or any other type of media content) as input from antennas (for broadcasted content), cables (from a cable service provider) or satellite dishes (from a satellite dish service provider), and also output signals to a television set or other display device for display to a user. A DVR may also receive media content from broadband network connections that may be connected to one or more networks containing media content, including the Internet.

A user may instruct the DVR to schedule a recording of specified content that may be broadcasted or otherwise transmitted to the DVR at some future time. Thus, the user may schedule the automatic recording of the content in advance of the time that the DVR receives the content. For example, the user might instruct the DVR to record unspecified content that will be broadcasted on a specified channel beginning at a specified date and time and ending at another specified time. For another example, the user might instruct the DVR to record a specified showing (on a specified channel, and beginning at a specified date and time) of a specified movie, specified event, or specified episode of a multi-episode television series. For another example, the user might instruct the DVR to record the next to-be-broadcasted instance of a specified movie, specified event, or specified episode of a multi-episode television series without specifying the date, time, or channel on which that instance will be broadcasted. For another example, the user might instruct the DVR to record all (or all first-run) episodes of a multi-episode television series on a specified channel without specifying the dates or times at which those episodes will be broadcasted. For another example, the user might instruct the DVR to record all (or all first-run) instances of movies, events, or episodes of a multi-episode television series that are associated with a specified keyword, a specified actor, and/or a specified director without specifying the titles, channels, or broadcasting times of those instances. For another example, a user might also instruct the DVR to download specified content from a media content provider on the Internet for future viewing.

As illustrated in the above examples, a DVR allows a user to search for and schedule programs for recording in a variety of ways. As other types of media content, such as video on demand, downloading content from networks, and online video vaults become more widely available, a user's search to find media content that interest them becomes more complex. In fact, some users may feel overwhelmed by the volume and variety of media content that is available. Under this circumstance, when these users do encounter particular media content they wish to record, the users may not be able due to DVR storage space constraints or other reasons (e.g., the users wish to record a different particular media content). If the user waits to later add the particular media content to schedule a recording, the user has to retrace his previous steps to find the particular media content. This process may be very frustrating for users.

For example, suppose a user accesses a video on demand server to download and watch a recently released movie. It is quite possible that as the user browses for a first media content, he may encounter a second media content that also interests him. Yet, in some cases (e.g., due to DVR space constraints, schedule of other recording media contents, not wishing to pay for the content until the user is sure to watch the content, etc.), the user cannot record the second media content at that time. If the user decides to come back and schedule the second media content later, the user generally has to retrace their steps to find the second media content. This process may include navigating through various menu screens, repeating previously performed keywords searches, and other inconvenient details to find the second media content. Moreover, the user may navigate to an incorrect menu, misspell a keyword, or perform other minor errors. This results in the user becoming increasingly frustrated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows an example of a DVR-presented screen that illustrates a menu with a folder containing program shortcuts, according to an embodiment of the invention;

FIG. 4 shows an example of a DVR-presented screen that illustrates a menu with a program shortcut, according to an embodiment of the invention;

FIG. 6 shows an example of a DVR-presented screen with a user interface control that allows a user indicate that he wishes to generate a program shortcut, according to an embodiment of the invention;

FIG. 7 shows an example of a DVR-presented screen that illustrates a user interface control to generate a program shortcut, according to an embodiment of the invention;

FIG. 9 shows an example of a DVR-presented screen that illustrates a folder that may contain program shortcuts, according to an embodiment of the invention;

FIG. 10 shows an example of a DVR-presented screen that illustrates menu items that allow a user to access a program shortcut, according to an embodiment of the invention;

FIG. 11 shows an example of a DVR-presented screen that illustrates a menu item that allows a user to purchase video on demand content that is indicated by the program shortcut, according to an embodiment of the invention;

FIG. 12 shows an example of a DVR-presented screen that illustrates a menu item to allow a user to confirm the video on demand purchase request, according to an embodiment of the invention;

FIG. 14 shows an example of a DVR-presented screen that illustrates a folder that contains program shortcuts, according to an embodiment of the invention;

FIG. 16 shows an example of a DVR-presented screen that illustrates confirmation of a download request to download the particular media content, according to an embodiment of the invention;

FIG. 17 shows an example of a DVR-presented screen that illustrates a menu item to view recommended media content based upon viewing information for a particular media content, according to an embodiment of the invention;

FIG. 21 shows an example of a DVR-presented screen that illustrates existing program shortcuts in a group, according to an embodiment of the invention;

FIG. 22 shows an example of a DVR-presented screen that prompts a user to record media content referenced from a program shortcut, according to an embodiment of the invention;

DETAILED DESCRIPTION

Figure 1:
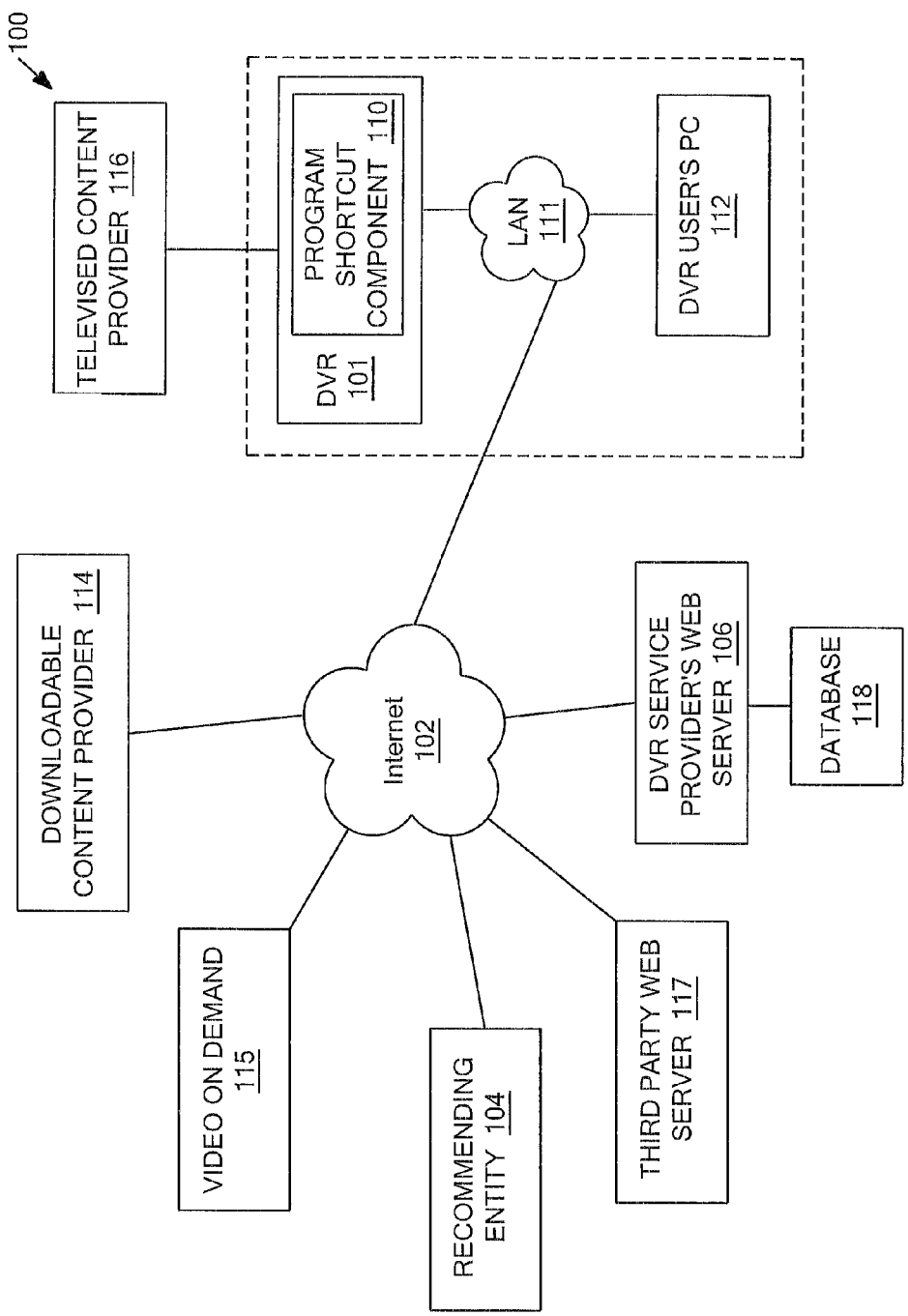
FIG. 1 is a block diagram illustrating a system on which a DVR user may create program shortcuts, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Systems and techniques described herein allow DVR users to create program shortcuts to media content. As used herein, media content may refer to, but is not limited to, movies, television programs, downloadable content, video on demand content, content from websites, or any other media content that may be retrieved by the user. In an embodiment, a user generates program shortcuts to media content that the user finds interesting. According to an embodiment, a program shortcut mechanism allows the user to generate the program shortcuts that link to the referenced media content. For example, suppose a user conducting a search identifies a particular media content that the user finds interesting. The user might initiate a program shortcut mechanism that creates a program shortcut object to the media content. The program shortcut object may contain a reference or link to the particular media content itself, or to an access point that allows the user to retrieve the media content. These access points may include a menu to initiate a download of the media content or a menu to initiate a video on demand to view the media content.

In one embodiment, the program shortcut object is added as a menu item of the DVR that is easily accessible to the user. As used herein, a menu item that is easily accessible is a menu item that requires limited input commands in order to access, and thus may be accessed by the user easily and frequently. A menu that is accessible may described as "close" for the user. As used herein, "close" may be described through an example. A DVR menu structure might contain ten hierarchical levels (e.g., the menu is ten levels deep). Under this circumstance, an accessible menu is closer, in terms of depth, to the main (or root) menu than the last (or leaf) menu. Alternatively, an accessible menu may refer to a DVR-screen that is opened with limited input commands (e.g., only two or three keystrokes on a remote control or other input device). For example, in a TiVo DVR system, a "Now Playing List" might be an accessible menu because the "Now Playing List" is accessible from any point within two keystrokes from the input device. In other embodiments, an accessible menu is a menu that is able to be opened with a single command (e.g., a dedicated button on a remote control or other input device).

Program shortcuts may allow users to find and record media content that matches their interests without having to perform an additional search. The systems and techniques described herein may automatically create program shortcuts for particular media content. In an embodiment, an analysis mechanism analyzes media content that the user has selected for recording and selects media content related to the user-selected media content to create program shortcuts. For example, a user might schedule to record media content that includes a plurality of poker-related programs. Under this circumstance, an analysis mechanism would conclude that the DVR user is interested in poker-related programming. The analysis mechanism may use of any type matching algorithms to find programs of matching interests such as, but not limited to, favorite actors, favorite themes, favorite categories (e.g. romantic comedies in HD), or any other matching methods.

Returning to the poker-related programming example, when the analysis mechanism encounters a poker-related program being offered through VOD, the analysis mechanism determines that this new program may be of interest to the user and generates a program shortcut to the VOD program. The analysis mechanism is not limited to VOD, as the analysis mechanism may also search and generate program shortcuts to media content via broadcast, download partners (such as Amazon or Netflix), or any other content delivery system.

In one embodiment, a program shortcut mechanism generates a program shortcut to related media content. The program shortcut mechanism may place the newly created program shortcuts in many different locations that vary according to implementation. For example, the program shortcut to a poker related media content might be placed in a user's poker-related wish list. Thus, when the DVR user accesses his other poker-related programming, the DVR may notify the user that an additional poker-related programming is available to be recorded. In one embodiment, the user is notified of the program shortcuts through an icon or graphical representation on the screen. In other embodiments, the notification may come via email, pop-up message, text message, on-screen message, or any other method that may indicate the shortcut to a user.

The program shortcut may allow the user to download the referenced media content at any time. Downloading may occur during off-peak hours when download speeds may be fastest or after additional storage space becomes available or is added on the DVR. In addition, the program shortcut may allow the user to stream the referenced media content at any time through providers such as Netflix, YouTube, or video-on-demand for immediate viewing.

The systems and techniques described herein may be further expanded to link to media content from a wide-range of sources. For example, the program shortcut mechanism may be used to link to downloadable content (e.g., through iTunes, TivoCast, or Yahoo! TV), shared video files (e.g., media content uploaded and published by a friend or family member), content suggested by a recommending entity, content derived from the television broadcaster, video feeds, advertising data (e.g., commercials with embedded address information), and other media content accessible through the Internet and other networks.

System Overview

FIG. 1 is a block diagram that illustrates a system in which a user may create program shortcuts or "bookmarks" to selected content, web downloads, recommended programs, and/or other suggested media content, according to one embodiment of the invention. The system shown is only one of many different systems in which embodiments of the invention may be implemented. Other systems in which embodiments of the invention may be implemented may include more or fewer components than those shown in FIG. 1.

The system 100 shown in FIG. 1 comprises a DVR 101 that includes, in one embodiment, a program shortcut component 110, a LAN 111, and a personal computer (PC) 112. In addition, system 100 includes a DVR service provider's web server 106 connected to database 118, a televised content provider 116 (such as a broadcaster, satellite television provider, cable television provider, IPTV provider, etc.), a downloadable content provider's web server 114, a video on demand provider 115, a recommending entity 104, and third-party web servers 117. Typically, DVR 101 and user's PC 112 are both connected (either physically or wirelessly) to LAN 110. Typically, DVR 101, LAN 111, and DVR user's PC 112 all will be located in the same residence.

In one embodiment, DVR 101 receives, records, and presents media content that DVR 101 receives from televised content provider 116. A televised content provider may provide content by broadcasting media content over-the-air, through a cable television provider, or a satellite dish service provider. LAN 111 is connected to Internet 102. Through LAN 111, DVR user's PC 112 and DVR 101 may communicate with other devices that are also connected to Internet 102. DVR service provider's web server 106, third-party web server 117, recommending entity 104, video on demand provider 115, and downloadable content provider 114 are also connected to Internet 102. Each of these entities, providers, and servers may communicate with each other and DVR 101 via Internet 102 and LAN 111 using web service protocols or any other communications protocol. DVR user's PC 112 may execute an Internet browser application (e.g. Microsoft Internet Explorer or Mozilla Firefox). DVR user's PC 112 and DVR service provider's web server 106 may communicate with each other via Internet 102 and LAN 110 using Hypertext Transfer Protocol (HTTP) or any other communications protocol.

DVR service provider's web server 106 is connected to database 118. DVR service provider's web server 106 may store data into and retrieve data from database 118. DVR 101 can download content (e.g., files) from downloadable content provider's web server 114 via Internet 102 and LAN 111 using any type of communications protocols, including, but not limited to, HTTP or File Transfer Protocol (FTP).

Third-party web server 117 is connected to Internet 102. Third-party web server 117 may communicate with PC 112 and/or DVR service provider's web server 106 through Internet 102 using any communications protocol, such as HTTP.

Recommending entity 104 also is connected to Internet 102. Recommending entity 104 may communicate with DVR service provider's web server 106 through Internet 102 using any communications protocol, such as HTTP.

Video on demand provider 115 is connected to Internet 102. DVR 101 can download on demand content from provider 115 via Internet 102 and LAN 111 using protocols such as HTTP and File Transfer Protocol (FTP). Video on demand provider 115 may communicate with DVR service provider's web server 106 through Internet 102 using protocols such as HTTP.

Program Shortcuts

A program shortcut, as used herein, generally refers to an object that comprises a reference or link to retrieve, download, stream, purchase, record, or initiate video-on-demand of particular media content. The program shortcut may include a variety of methods and routines. A program shortcut may contain a reference to the particular media content itself. A program shortcut may also contain information about the media content, or contain a reference to reach a screen, method, or routine on which accessing, purchasing, and/or downloading the media content may occur. In addition, program shortcuts may contain functions to verify digital rights to a particular set of data. The program shortcut allows a DVR user to quickly access particular media content without having to navigate through a number of domain spaces or menus to find the particular media content again. Accordingly, program shortcuts are created in menu locations that are easily accessible to the user.

Program shortcuts may remain active for varying periods of time. A program shortcut may last as long as the referenced media content is still available. Once the referenced media content is no longer available, the program shortcut is no longer valid and may be automatically removed. In some instances, a user may delete a program shortcut if the user no longer wishes to access or record the referenced media content. In one embodiment, the user specifies how long a program shortcut remains valid. In other embodiments, the owner of the media content may set expiration dates on the media content and/or program shortcut. For example, a movie company might release a trailer advertising a particular film. The movie trailer company might wish to remove the trailer after the movie is no longer shown in movie theaters. The movie theater company might set an expiration date on the trailer or explicitly remove the trailer and all program shortcuts to the trailer when the movie is no longer shown in theatres. In these and other ways, the program shortcuts may be designed to expire.

Program Shortcut Component

In FIG. 1, program shortcut component 110 generally represents a component of a software application that allows a DVR user to search, browse, navigate, and view electronic information. The program shortcut component 110 allows a DVR user to create links (or "bookmarks") to information or media content that the DVR user finds interesting. For example, the program shortcut component 110 may be part of a web browser, a document viewer, RSS newsreader, mail client, document editor, a database client application, or other software tool for navigating electronic information.

In one embodiment, the program shortcut component 110 is a stand-alone application such as a desktop application, screen saver, or some other application with user interface controls to create the program shortcuts. Alternatively, the program shortcut component 110 is a tool designed to work in connection with another application, such as a web browser. For example, program shortcut component 110 can be a module of, extension to, or plug-in for a web browser.

In system 100, the program shortcut component 110 is illustrated as a component of DVR 101. In alternate implementations, the program shortcut component 110 may be a component of DVR user's PC 112.

Menu for Viewing a Program Shortcut

Figure 2:
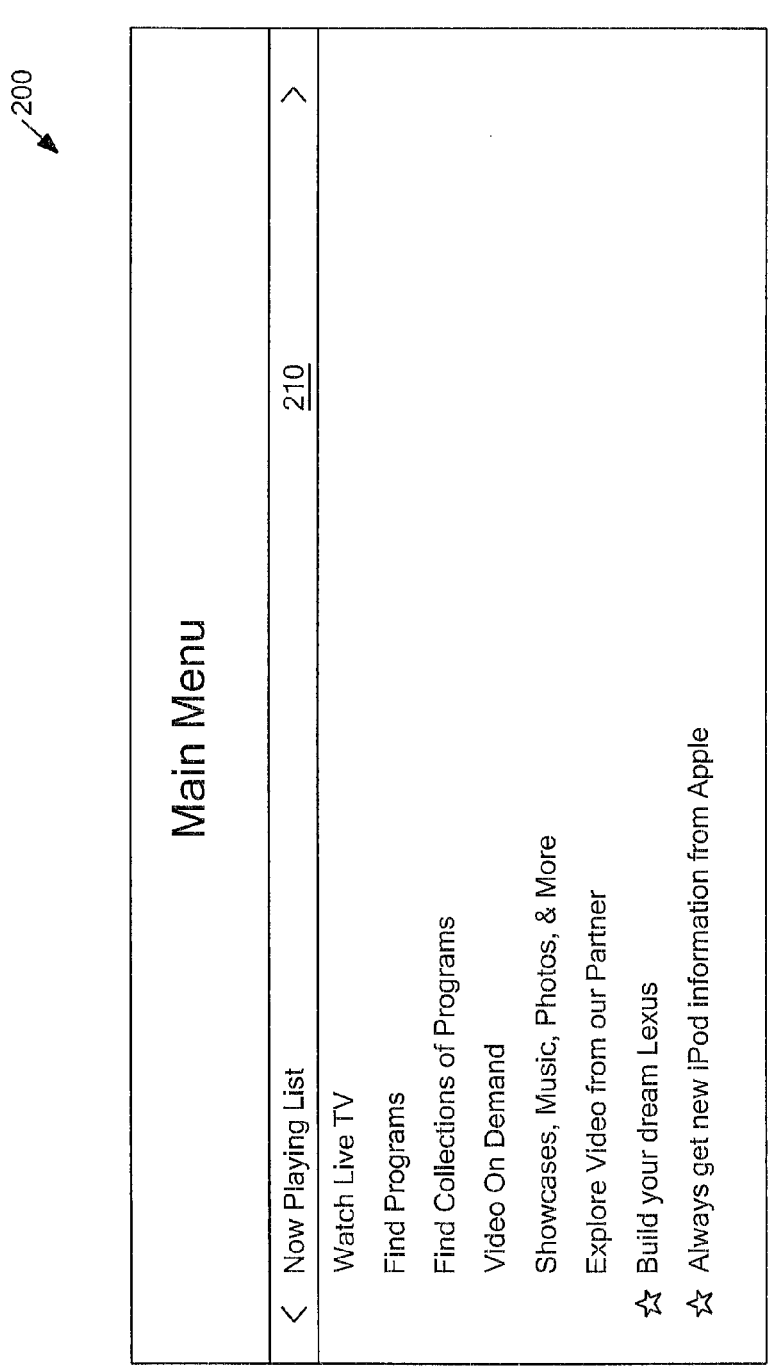
FIG. 2 shows an example of a DVR-presented screen illustrating a main menu to access program shortcuts, according to an embodiment of the invention.

FIG. 2 illustrates an example of a main menu for enabling a DVR user to create program shortcuts to media content in a DVR system 100. In one embodiment, main menu 200 is displayed to the user on PC 112 as the user accesses his DVR hard disk to review recorded programs. Alternatively, the main menu 200 combines data from a variety of sources, (e.g. information from the DVR service provider's web server 106, the video on demand provider 115, etc.). In one embodiment, the menu 200 is part of a menu structure for DVR 101. Main menu 200 illustrates a number of options that may be available to a user as they select, organize, and manage media content on their DVR. For example, main menu 200 may include a "Now Playing List" option 210 as the first item listed in the menu. Other options in the main menu 200 may include items such as, but not limited to, "Watch Live TV", "Find Programs", "Find Collections of Programs", "Video on Demand", etc.

If the DVR user selects the "Now Playing" option 210, then the "Now Playing List" menu appears. FIG. 3 illustrates an example of how the "Now Playing List" menu may appear when the user opens the item from the Main Menu. In FIG. 3, the "Now Playing List" menu 300 lists a number of programs that have been recorded and are available to view. For example, as illustrated in FIG. 3, the DVR has recorded from televised content provider 115 the programs: "My Name is Earl" and "The Office". Most of the other folders indicate programs and categories of programs that have also been recorded (or scheduled to record). For example, "The Sopranos" folder indicates that two episodes of the television program "The Sopranos" have been recorded (or are scheduled to record).

The Now Playing List 300 also lists a Poker folder 311 and a Bookmarks folder 312. Notice that the Poker folder 311 has a starred icon on top of the folder. In one embodiment, an icon or any other graphical indication is used to indicate that a menu item contains a program shortcut. For example, the star icon on the Poker folder 311 might indicate that the Poker folder contains a program shortcut to poker-related media content. Thus, if the DVR user elects to open the Poker folder 311, then the DVR user is presented with a list of poker-related content where the content includes at least one program shortcut.

For example, FIG. 4 illustrates an example of the poker menu 400 that might be opened when the DVR user selects the Poker folder 311 option. In FIG. 4, the poker menu 400 lists a variety of poker-related media content, including program shortcut 411. In this case, the program shortcut 411 links to a downloadable program (indicated by the (CDS) icon to the right of the title) called "Poker: Learn from the Pros." By selecting the item "Poker: Learn from the Pros" 411 indicated by right arrow 410, the user may download the particular media content. In one embodiment, the program shortcut 411 was created automatically by a program shortcut component like the one described in connection with FIG. 1. Alternatively, the program shortcut 411 may have been created by the DVR user by selecting the media content from a list of available programs.

Referring back to FIG. 3, in one embodiment, the folder, "Bookmarks" 312, is a general repository for all program shortcuts. In an embodiment, when a user creates a program shortcut, the program shortcut may be placed in the "Bookmarks" folder 312 based upon a default setting. In other implementations, the DVR user may be prompted to specify a location where a program shortcut should be placed. In an embodiment, the program shortcuts may be created and automatically saved to a location based on a category, genre, the type of media content etc. For example, bookmarks for movies that are available to download, stream, or watch on video-on-demand might by placed into a folder called "Movies on demand." This allows the user to create a list of movies they are interested in viewing, available from a wide variety of sources, and all in a single location. In an embodiment, a link to the bookmark folder 312 may be located on the main menu 200 for accessibility or in another accessible menu.

Creating Program Shortcuts for Video on Demand

According to an embodiment, to create a program shortcut for video on demand media content, a DVR user accesses a search mechanism to retrieve information about the video on demand content that is available. For example, in one embodiment, the DVR user might access a web browser on PC 112. The web browser connects through the Internet 102 to the video on demand provider 115, which in turn returns a list of scheduled video on demand content. In another embodiment, the DVR user may access the video on demand content through DVR 101.

Figure 5:
FIG. 5 shows an example of a DVR-presented screen that allows a user to search for particular media content, according to an embodiment of the invention.

FIG. 5 illustrates an example search user interface 500 for searching for video on demand media content from video on demand provider 115. In an embodiment, the video on demand provider 115 sends programming data to the DVR service provider's web server 106 where the programming data is stored in database 118. In an embodiment, to access video on demand content, PC 112 accesses the DVR service provider's web server 106 to search for video on demand content. Only after the DVR user has selected a particular video on demand program will the DVR user be directly connected to the video on demand provider 115.

In FIG. 5, the DVR user accesses a menu 500 with a search box 510. Search box 510 allows the user to input alphanumeric characters that correspond to the letters that begin keywords to be searched for by the video on demand provider 115 (or, alternatively, in database 118). Suppose, in this case, the DVR user would like to watch "The Philadelphia Story". Accordingly, the DVR user inputs the letters "PHIL" that correspond to the beginning letters in the title "Philadelphia Story" in search box 510. A search request is sent to the video on demand provider (or, alternatively the DVR service provider's web server). The result of the search query is the list of available media content shown on the right. The DVR user, in an embodiment, selects "The Philadelphia Story" to be downloaded to the DVR. In this case, the DVR user also notices the movie entitled "Philadelphia". The movie "Philadelphia" is a movie the user has not seen. After reading a brief summary of the movie, the DVR user becomes interested in viewing the movie "Philadelphia." The DVR user, however, does not want to purchase the movie at this particular time, but would like the option view the movie later.

Hence, in one embodiment, the DVR user highlights and selects the "Philadelphia" menu item 512 to begin the process of creating a program shortcut. After highlighting and selecting "Philadelphia" 512, the DVR user is presented with a second menu that is illustrated in FIG. 6

FIG. 6 illustrates an example of a user interface 600 that allows a user to indicate to the DVR system to create a program shortcut for the selected media content. For example, in FIG. 6, the create user interface includes a set of controls that allow the user to choose between buying and watching the movie immediately, creating a program shortcut 610 (e.g., "bookmarking the program"), as well as other options. Here, the DVR user wishes to create a program shortcut so the user may easily find and download or stream "Philadelphia" for viewing at a later time. Thus, the DVR user highlights and selects the "Bookmark this Program" option 610. In an embodiment, upon selecting the "Bookmark this Program" option 610, a program shortcut component, such as component 110 described in connection with FIG. 1, creates a program shortcut for the selected program in a default location (e.g., the Now Playing List). Alternatively, the user may be asked to confirm their selection.

FIG. 7 illustrates an example of a confirmation user interface 700 for confirming whether to create a program shortcut for the specified media content. In one embodiment, user interface 700 displays information about the availability of the media content, the content's expiration date (e.g., when the program is no longer available), and other information about the program. The DVR user confirms (using "Yes" control 710) adding a program shortcut to the Now Playing List for "Philadelphia". In an embodiment, after confirming that a program shortcut should be created for the program, a program shortcut is created in the specified location. In another embodiment, the DVR user may be prompted to specify where to place the program shortcut. In other embodiments, the program shortcut may be placed in a location based on a set of filtering criteria (e.g., genre of movie, price, movie actor, title, etc.). After the user confirms creation of a program shortcut for "Philadelphia," a screen indicating completion of the task may be shown to the user.

Figure 8:
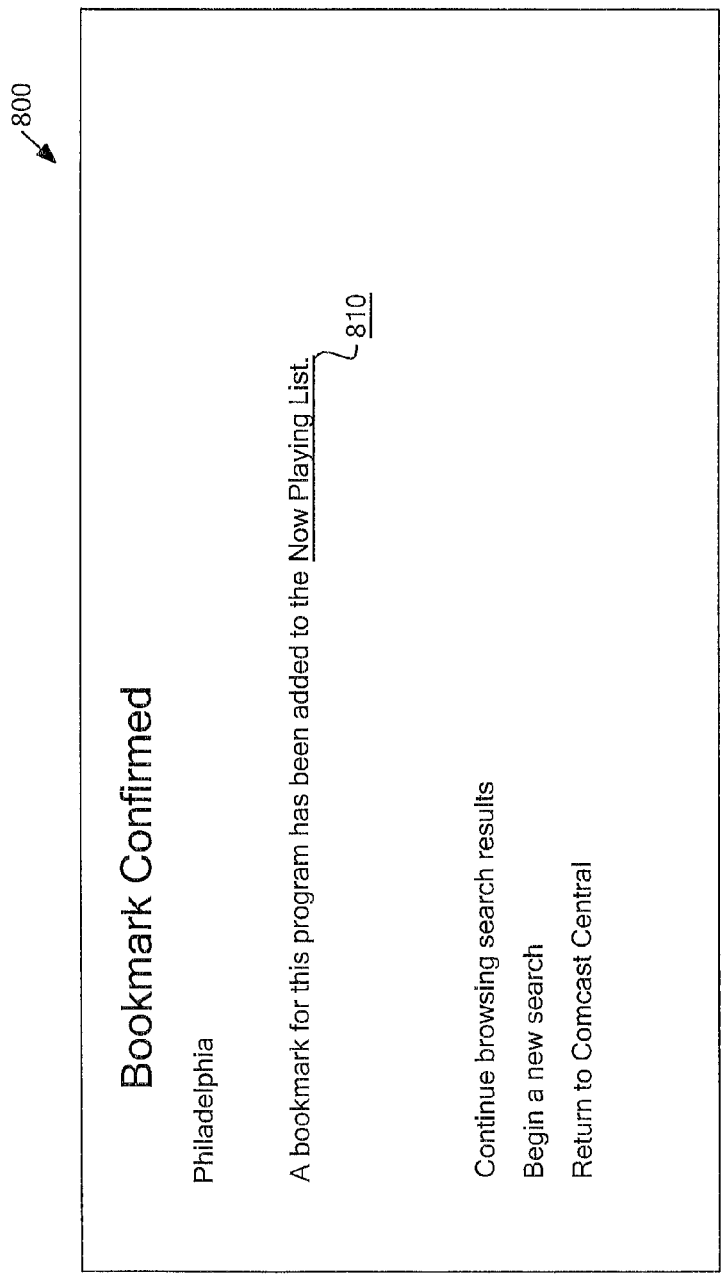
FIG. 8 shows an example of a DVR-presented screen that illustrates a confirmation of generation of a program shortcut, according to an embodiment of the invention.

FIG. 8 illustrates an example completed user interface 800 for informing the DVR user that the program shortcut has been created. For example, the DVR user might receive a message indicating that the program shortcut creation process is complete and added to the appropriate location (e.g., the Now Playing List 810) after confirming creation of the program shortcut.

FIG. 9 illustrates an example Now Playing List 900, similar to the list described in connection with FIG. 3. As shown in FIG. 9, the Now Playing List 900 includes an "On Demand" folder 910 with a star icon in close proximity. The star icon, or any similar graphical indicator, may indicate that the folder contains at least one program shortcut. In other embodiments, a different mechanism may be used to indicate that a folder contains a program shortcut. For example, a different icon might be used or the folder itself may change appearance such as being shown in a different color. The DVR user may highlight and select the "On Demand" folder 910 so that the current list of "On Demand" programs and program shortcuts is opened.

FIG. 10 illustrates an example view 1000 of the "On Demand" folder shown in FIG. 9. FIG. 10 shows all of the downloaded video on demand content (e.g., Spiderman 2 1020) as well as four program shortcuts: "Philadelphia" 1010, "Goodfellas" 1030, "Raging Bull" 1040, and "X-Men" 1050. Program shortcuts or bookmarks are indicated with the graphical indication "B" and the "Spiderman 2" movie has a graphical indication of "!" to indicate that the media content is available but may soon be unavailable. As illustrated, the highlight bar is selecting the "Philadelphia" program shortcut. If the user selects the "Philadelphia" program shortcut 1010, additional information may be displayed about "Philadelphia."

For example, the user might highlight and select the "Philadelphia" program shortcut 1010. Selecting program shortcut 1010 in the video on demand context initiates a series of steps that allow the user to purchase the video on demand content. For example, the user might select the program shortcut 1010 to reveal the screen 1100 as shown in FIG. 11. In FIG. 11, the DVR user may elect to buy the movie by selecting 1110. The user also has the opportunity to delete the bookmark 1120, view recommended content with respect to "Philadelphia" 1130, and other options 1140.

Figure 13:
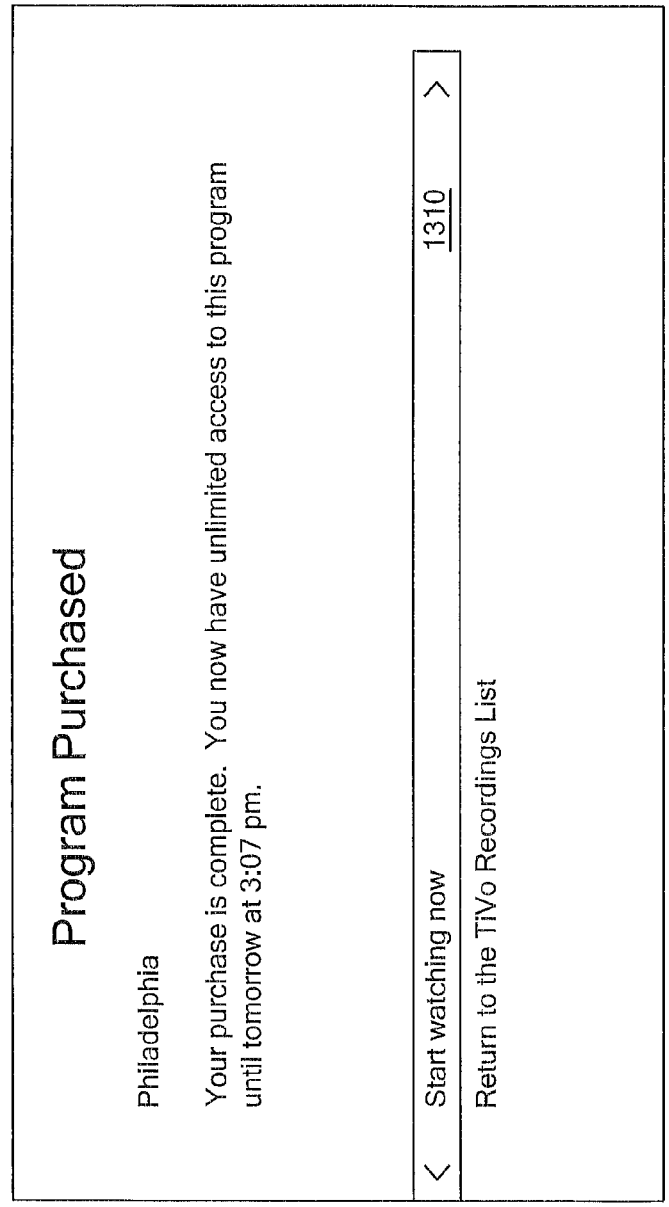
FIG. 13 shows an example of a DVR-presented screen that illustrates completion of the video on demand purchase request, according to an embodiment of the invention.

A user purchasing the movie is illustrated in FIGS. 12 and 13. In FIG. 12, if the user decides to buy the movie, then the user is asked to confirm the purchase 1210 in screen 1200. Finally, in FIG. 13, the user completes the media content purchase and may proceed to watch the movie by selecting 1310.

Note that by placing the program shortcut in the Now Playing List, the program shortcut is very accessible to the DVR user. The Now Playing list displays all of the recorded media content that is available to view on the DVR and is thus, a popular destination for DVR users. By placing program shortcuts in a location familiar to users, access to the program shortcuts becomes relatively simple. In addition, the Now Playing List is an accessible menu for the user.

In an embodiment, program shortcuts for video on demand content may be automatically generated. For example, a user might express an interest in poker by creating a wish list that includes numerous poker-related programs. In one embodiment, the DVR 101 or PC 112 may automatically create program shortcuts to any program that is related to poker when that program is detected as a video on demand program. A shortcut may be generated when the media content appears as the video on demand provider updates the DVR service provider's web service provider's electronic programming guide. Similarly, media content may be matched to programs added to a catalog from broadband video on demand providers, such as, but not limited to Amazon, Netflix, and Blockbuster.

The various menus illustrated in FIGS. 5-13 include various features, controls, and options that may vary between implementations. For example, in one embodiment, the menus used to create a program shortcut may be more or fewer than those illustrated in FIGS. 5-13. Moreover, the specific menu options and wording may differ from one implementation to another.

Creating Program Shortcuts for Downloadable Content

Downloadable content generally refers to any media content that may be downloaded upon request by the DVR user. For example, web services are increasingly available that provide downloadable versions of recent television programs and movies. In one embodiment, a user may access and purchase downloadable content through their PC 112 or DVR 101. Examples of providers of downloadable content include, but are not limited to, TivoCast, YouTube, and iTunes. Downloadable content may also refer to content that is streamed to a user for immediate viewing. Streamed content is content constantly received by, and presented to a user as the content is being delivered by a streaming provider, such as, but not limited to YouTube or Netflix.

To illustrate the process of creating a program shortcut for downloadable content, suppose a DVR user accesses a search mechanism that retrieves data about the downloadable content. For example, in one embodiment, the DVR user accesses a web browser on PC 112. The web browser connects through the Internet 102 to the downloadable content provider 114, which in turn returns a list of scheduled video on demand content. Note that in another implementation, the DVR user may access the downloadable content in a similar fashion through DVR 101.

In a manner similar to that described in connection with FIG. 5, the DVR user may access a search user interface for finding downloadable content from downloadable content provider 114. In one embodiment, the downloadable content provider sends information about the downloadable content provider's media content to the DVR service provider's web server 106 where the media content is stored in database 118. Thus, in one embodiment, to access downloadable content, PC 112 accesses the DVR service provider's web server 106. The DVR user is then connected to the DVR after the user has selected downloadable content.

Using a search user interface, the DVR user accesses a menu with a search control that allows the user to input keywords to be sent to the downloadable content provider 114 (or, alternatively, to database 118). Suppose, in this case, the DVR user would like to watch a show called "Poker: Learn from the Pros." Accordingly, the DVR user performs the appropriate query, which sends a search request to the downloadable content provider (or, alternatively the DVR service provider's web server). The result of the search query is a list that contains at least one entry for "Poker: Learn from the Pros". The DVR user, however, does not want to download, purchase, or watch, the content, at this particular time, but would like the option to return and access the show later. The user may also not wish to watch the content, but just mark the content for later reference or to show the content to others.

Hence, in one embodiment, the DVR user highlights and selects "Poker: Learn from the Pros", which begins the process of creating a program shortcut for the program. After highlighting and selecting "Poker: Learn from the Pros", the DVR user is presented with a second menu similar to the menu illustrated in FIG. 6

The DVR user indicates that a program shortcut should be created for the selected downloadable content. (e.g., by highlighting and selecting a "Bookmark this Program" option). In one embodiment, upon selecting the "Bookmark this Program" option, a program shortcut component, such as component 110 described in connection with FIG. 1, creates a program shortcut for the selected program in a default location (e.g., the Now Playing list). Alternatively, the user may save the downloadable content elsewhere.

The DVR user continues to follows steps similar to those illustrated in FIGS. 7-8. For example, in one embodiment, the DVR user confirms their desire to create a program shortcut for the specified media content. In one embodiment, the program shortcut is then created in a specified location. The location may be input by the DVR user that may be a default location, or the location may be automatically determined according to a set of predetermined criteria. The predetermined criteria may include, but is not limited to, the population of an existing menu (not too many items in the menu), the closeness of (or number of input commands needed to reach) the menu to the main menu, or the frequency with which a user accesses the particular location.

FIG. 14 illustrates another example Now Playing list 1400, similar to the list described in connection with FIG. 3 and FIG. 9. As shown in FIG. 14, the Now Playing list 1400 includes a "Poker" folder 1410 with a star icon in proximity to the folder, which indicates that the folder contains at least one program shortcut. Here, the DVR user highlights and selects the "Poker" folder 1410 so that the current list of poker-related programs and program shortcuts is open. Once the folder is open, DVR user highlights and selects the "Poker: Learn from the Pros" program shortcut.

Figure 15:
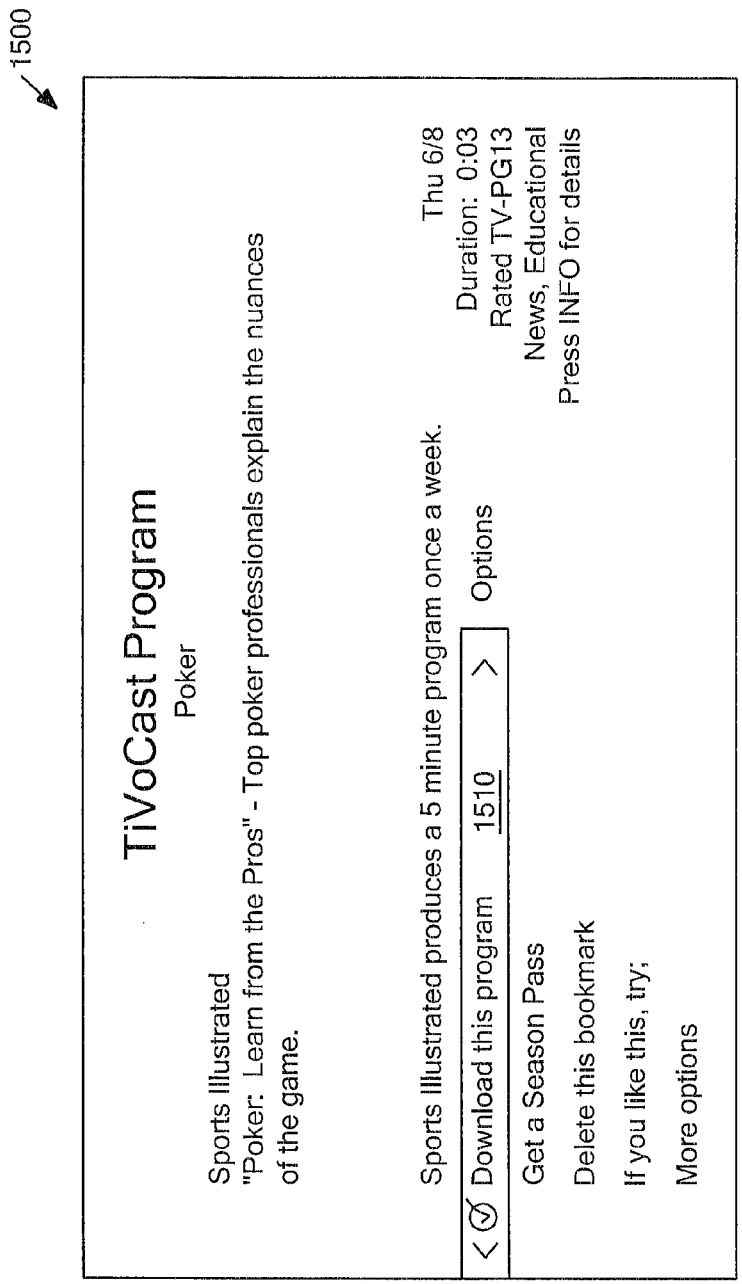
FIG. 15 shows an example of a DVR-presented screen that illustrates a menu item that allows a user to download particular media content referenced by the program shortcut, according to an embodiment of the invention.

FIG. 15 illustrates an example download user interface 1500. Here, the DVR user may elect to download the program immediately, setup season pass (e.g., download each new episode that is released), delete the program shortcut, etc. In one embodiment, additional information about the downloadable content may be displayed (e.g., the duration of the show, rating, etc.).

In this example, the DVR user downloads the program using the "download" control 1510, which initiates the download process. In one embodiment, once the download is complete, the DVR user receives confirmation 1600 that the program downloaded successfully.

The various menus illustrated in FIGS. 14-16 include various features, controls, and options that may vary between implementations. For example, in one embodiment, the menus used to create a program shortcut may be more or fewer than those illustrated in FIGS. 14-16. Moreover, the specific menu options and wording may differ from one implementation to another implementation.

Program Shortcuts for Recommending Entity

Recommending entities allow a user to receive recommendations to media content made by third parties. A recommending entity is further described in the U.S. Patent Application, "Recommended Recording and Downloading Guides", owned by the Applicant and incorporated by reference for all purposes herein. For example, a user might enjoy viewing classic movies. In one embodiment, a recommending entity comprising one or more movie critics provides recommended viewing options. In an embodiment, the recommended viewing media content shown may be based, at least in part, on criteria submitted by the user. For example, as illustrated in FIG. 17, a DVR user might search for and find "L.A. Confidential", a favorite movie of the DVR user. The DVR user might wish to watch another movie that is similar to "L.A. Confidential". Recommendation entities may present other media content that the DVR user may also enjoy based upon their preference for "L.A. Confidential."

Figure 18:
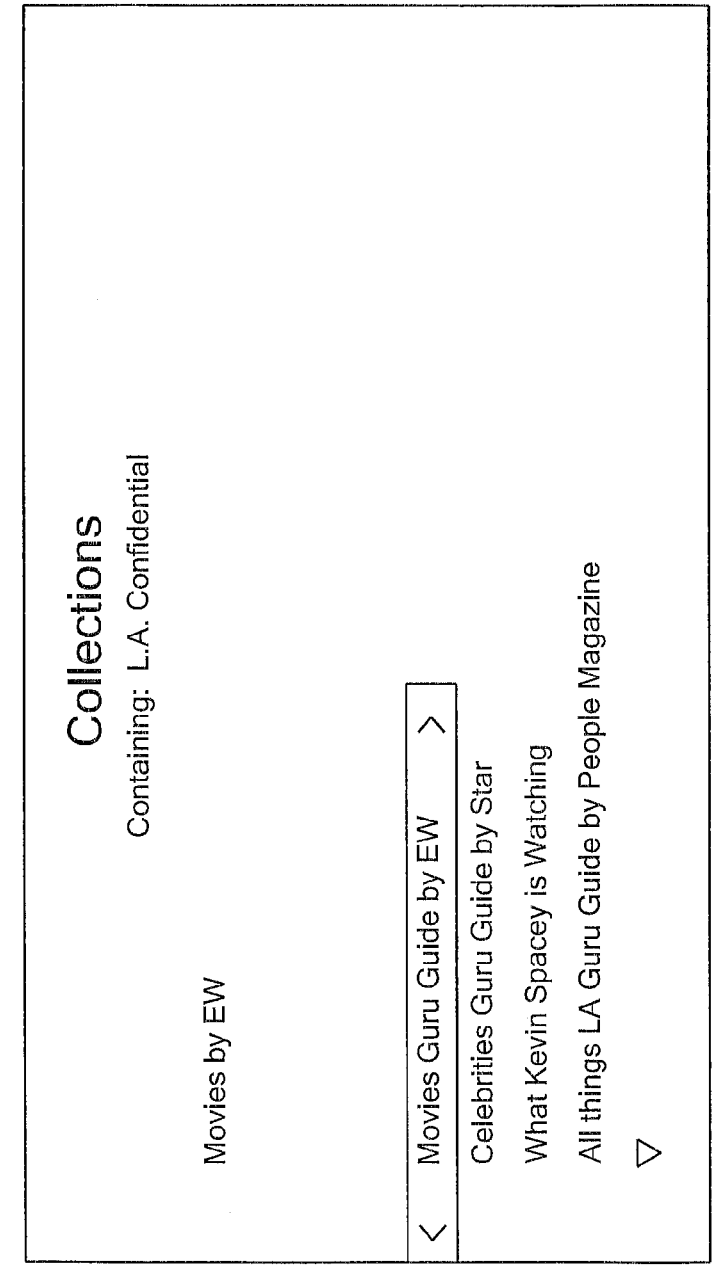
FIG. 18 shows an example of a DVR-presented screen that illustrates different recommended media content based upon selections from a particular recommending entity, according to an embodiment of the invention.

In FIG. 18, a recommending entity (e.g., a panel of movie critics from Entertainment Weekly) may evaluate the DVR user's selection and make recommendations based on the selection. For example, if the user likes "L.A. Confidential", then the recommending entity might (based on input from the critics) recommend other movies in the same genre, that feature the same actors, that are written by the same writers, that are produced by the same producers, or any other type of relation.

In one embodiment, the DVR user is presented with a list of the recommended movies and content. The user may selectively pick which media content to download immediately and which programs to bookmark for later use.

Figure 19:
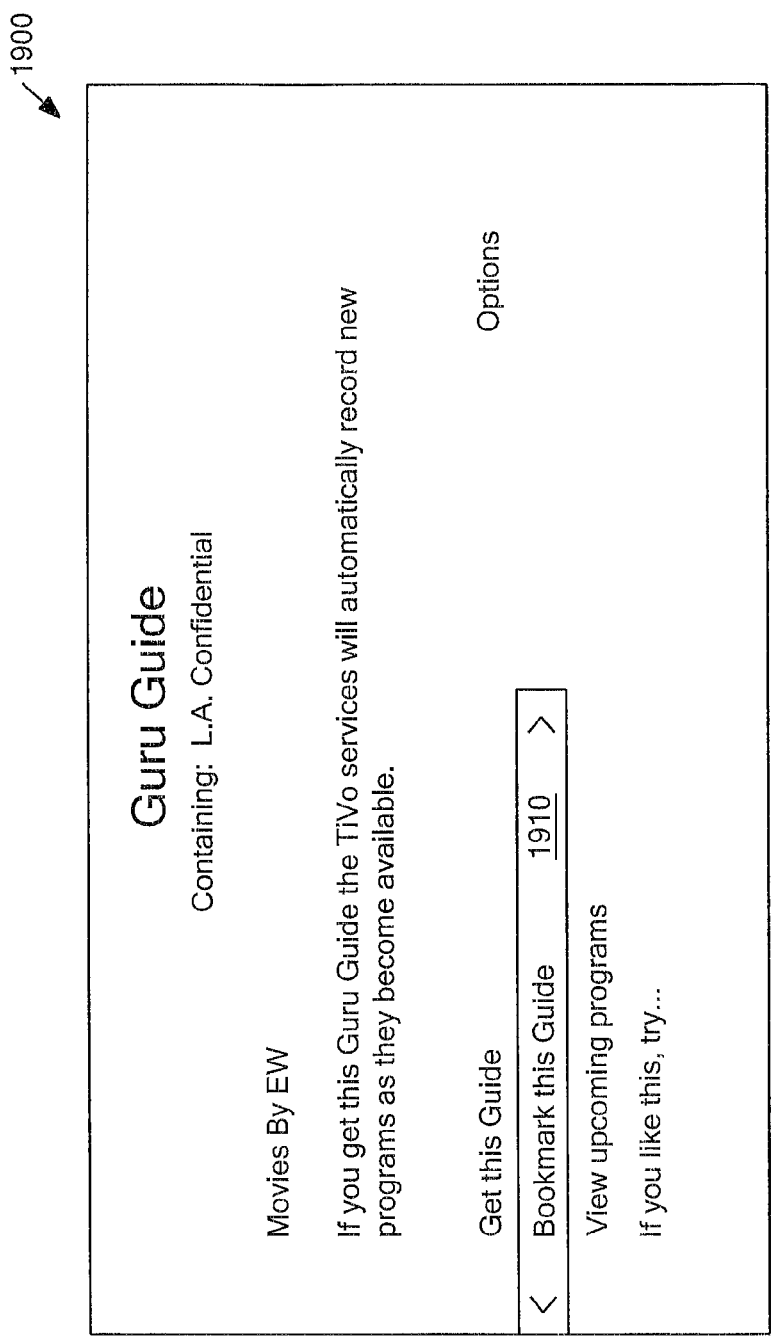
FIG. 19 shows an example of a DVR-presented screen that illustrates a menu item to generate a program shortcut that references a group of recommended media content from a particular recommending entity, according to an embodiment of the invention.

In some instances, the recommending entity may update recommendations on a periodic basis. In one embodiment, DVR user may create a bookmark to the recommending entity's list (or guide, or collection) of programs and access their recommendations as a group rather than as an individual program. FIG. 19 illustrates an example of a guide user interface 1900 for allowing the DVR user to create program shortcuts to the group of programs recommended by the recommending entity by making the selection "Bookmark this Guide" 1910. Program shortcuts may point to any type of grouped data, including multiple video on demand programs and groups of downloadable content.

Figure 20:
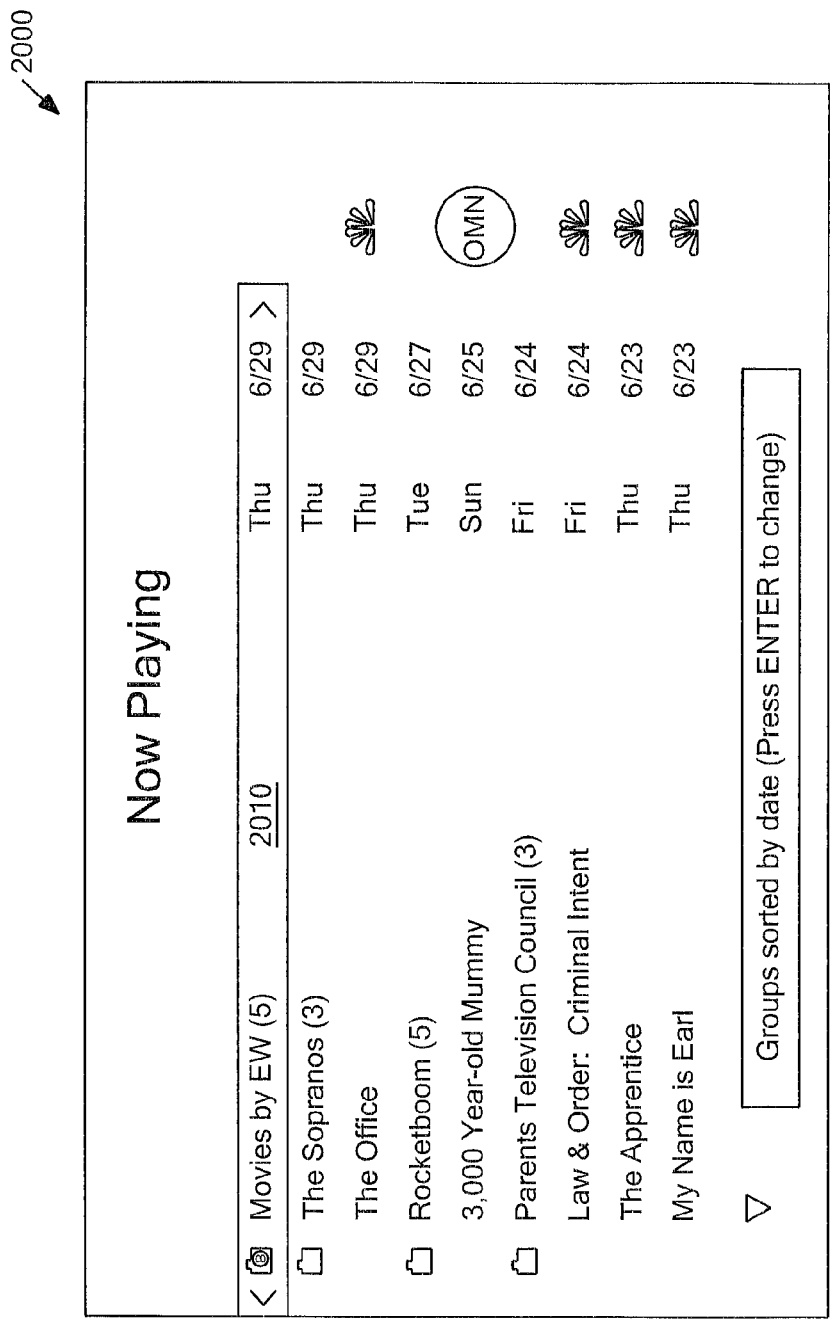
FIG. 20 shows an example of a DVR-presented screen that includes a folder that contains program shortcuts, according to an embodiment of the invention.

After the DVR user has created a program shortcut to a recommending entity's recommendations, additional program shortcuts may be made to recommendation updates. In one embodiment, when a new media content is added to the recommending entity's list of programs, a program shortcut is automatically created for those newly added programs. For example, in FIG. 20, DVR user has created a program shortcut to Entertainment Weekly's recommended movies. Over a period of time, the Entertainment Weekly recommendation entity adds movies to the recommended list. In one embodiment, DVR user accesses the Now Playing List 2000, highlights the "Movies by EW" option 2010, and opens the folder containing program shortcuts to Entertainment Weekly's recommended movies.

FIG. 21 shows a list 2100 of Entertainment Weekly's recommended movies. According to one embodiment, the DVR user may browse through the list of programs, read information about each program, and ultimately decide whether to record a program. The DVR user may read the information available on each of the five listed movies. For example, the DVR user might decide to watch "L.A. Confidential" 2110. The DVR user highlights and selects "L.A. Confidential" 2110 from the list. The DVR user may also highlight and select "Friday Night Lights" from the list. Under this circumstance, the user is transferred to a subsequent menu 2200. In FIG. 22, the DVR user may select to record 2210 the media content "Friday Night Lights."

With respect to the recommending entity's media content selections, the user may subscribe to a season pass of the recommended programs. If the user subscribes to a season pass, then the DVR may automatically download all of the recommended picks by the particular entity until the user indicates otherwise. If the media content selection requires a purchase, then a program shortcut may automatically be created for the selected content. The DVR user then has available a particular number of recommended programs, or program shortcuts for the programs, on their computer or DVR at any given time. Moreover, the programs may update over time. Thus, if a particular movie is removed from the recommended list, the corresponding program shortcut is automatically removed from the "Now Playing List" as well.

In one embodiment, additional controls may be applied that allow the user to select subsets of a recommending entity's picks. For example, the recommending entity 104 might pick a particular media content that the DVR user finds offensive. Under this circumstance, the DVR user would have the option to filter out particular programs, as well as particular categories, ratings, genres, etc. to remove any items that the user does not want.

Creating Program Shortcuts for Third Party Information

Third party information may refer to a wide variety of information. In an embodiment, third party information refers to data downloaded from the Internet (e.g., from Yahoo Video, YouTube, etc.) and transcoded into a format that is able to be played on a PC (such as PC 112 discussed in connection with FIG. 1). For example, a DVR user might be browsing the Internet 102 on their PC 112 and encounter a video that they find amusing. In one embodiment, the user downloads that video file to their PC, converts the video file into a format compatible with the DVR (e.g. MPEG2), and then uploads the file to the DVR.

In an embodiment, program shortcuts may be set up that references websites that upload media content on a regular basis. When the user wishes to access additional files, the DVR user simply selects the appropriate bookmark in the Now Playing List that indicates the website to the third party web server. Content is downloaded or streamed from the website and converted into a compatible format for the DVR (if necessary), and transferred to the DVR for viewing.

Figure 23:
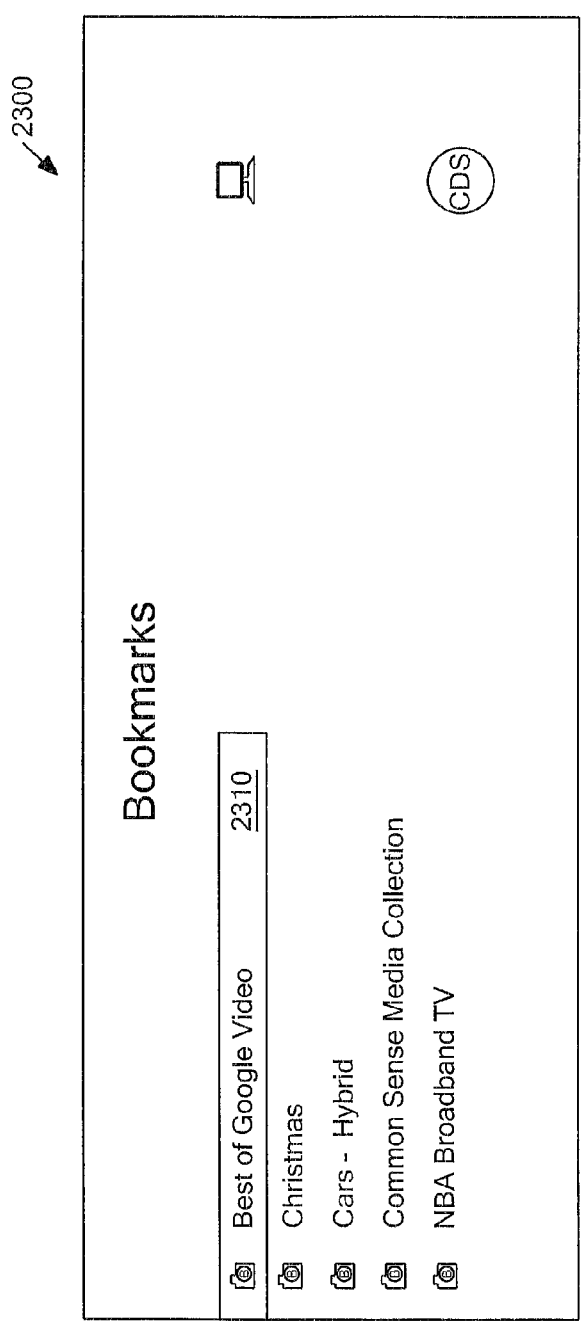
FIG. 23 shows an example of a DVR-presented screen that displays folders containing program shortcuts corresponding to third party websites, according to an embodiment of the invention.
Figure 24:
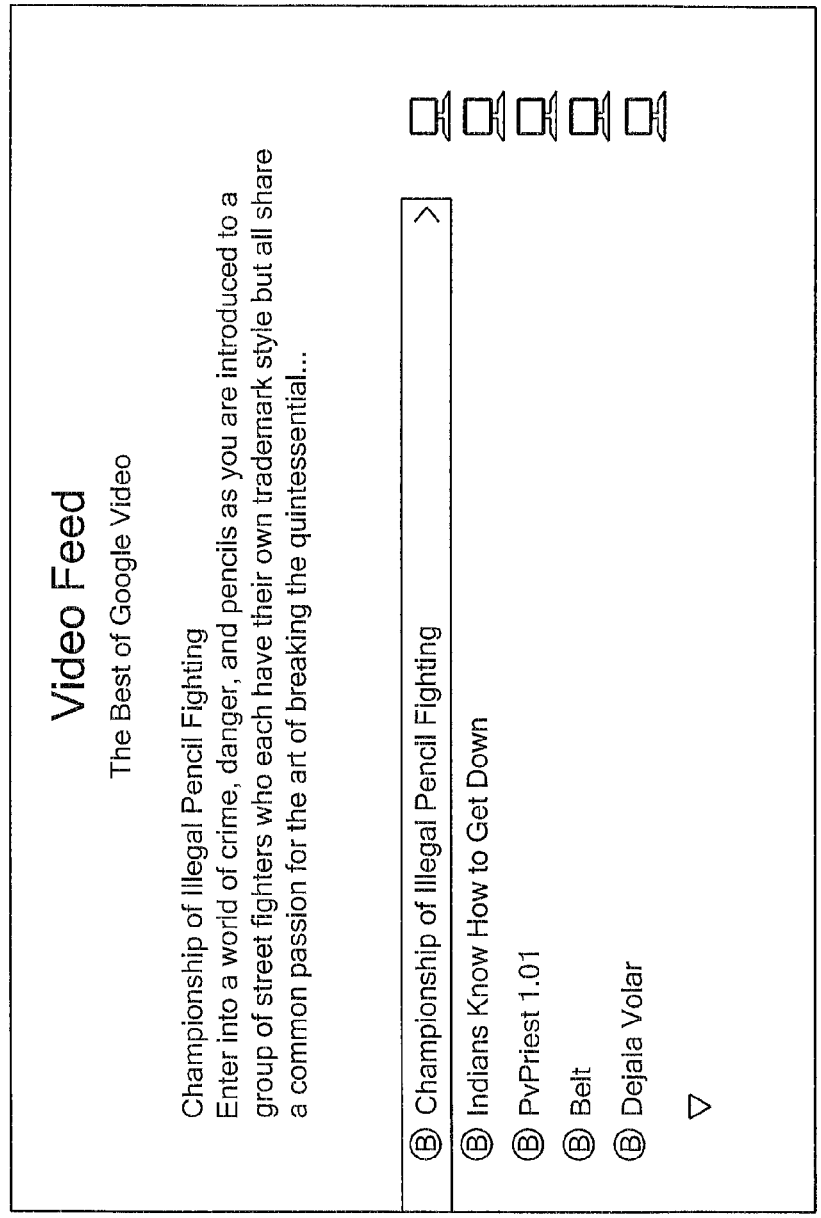
FIG. 24 shows an example of a DVR-presented screen that lists program shortcuts corresponding to a media content from a third party website, according to an embodiment of the invention.

For example, FIG. 23 illustrates a program shortcut user interface 2300 that lists a variety of sources for downloadable content. One of those sources is "Best of Google Video" 2310. A user may select "Best of Google Video" in order to view content from the "Best of Google Video" on the DVR. In an embodiment, the downloaded content from the website may contain links to further content that would appear as program shortcuts. For example, FIG. 24 shows a view 2400 of the "Best of Google Video" folder, including program shortcuts to video files on Google's website. Selecting the program shortcuts downloads the referenced media content for viewing by the user.

Creating Program Shortcuts to Third Party (Advertiser) Sites

In addition to the downloadable video content, a program shortcut may contain a reference to a particular website. Some media content may include tags and other embedded codes that transmit additional information to the user about the media content viewed. For example, a commercial for the automobile company, Lexus, might include interactive (e.g., embedded) data, such as a URL link or an icon indicating more available information at the bottom of the commercial screen. The user may click the URL link or icon to navigate to a web page containing more information about the particular product or program. The link might also lead to another media content download containing further information. Tags might also be applied to other media content, such as television shows, where a content provider embeds a tag in a television show for more information about related television shows.

In an embodiment, the program shortcut component enhances a user's ability to interact with the additional information. For example, the DVR user might not have the time to visit Lexus' website as the commercial airs. However, the commercial itself may be interesting enough that the user wishes to mark the link for additional information for a later visit. Accordingly, in one embodiment, the program shortcut component 110 extracts an embedded URL or link from the media content and creates a program shortcut that references the extracted URL address or link. Then, later when the user is available to browse the additional information, the user merely needs to access the saved program shortcut. The program shortcut contains a reference to the embedded URL address or link, and the user may then be transferred to the automobile company's website, or other location with additional information.

Creating Program Shortcuts for Program Data

Referring again to FIG. 1, program shortcuts may also be linked to data retrieved from the DVR service provider's web service 106 and/or televised content provider 114. In an embodiment, the televised content provider 114 transmits electronic programming information to the DVR service provider's web server 106, to be stored in database 118. Then, when a DVR user performs a find program action (e.g., by using a "Find Program" option, like the one illustrated in FIG. 2), the content from the electronic programming guide may also be bookmarked. For example, suppose the DVR user wants to watch an episode of the television program "My Name is Earl". The user might submit a query from the user's PC to find out when that particular television program airs. The query might also be submitted directly from the DVR.

The query is sent to the DVR service provider's web server, where the query is processed on the electronic programming guide data stored in database 118. In one embodiment, a result is returned listing at least the time and date that the program airs. As the user browses the electronic programming guide, in one embodiment, the DVR user notices the program "The Office" and recalls overhearing excellent reviews regarding the program. However, the user only has the space and time to record one of the programs. In one embodiment, the DVR user sets a program shortcut on "The Office" listing in the electronic programming guide. As detailed above, when the user indicates (e.g., by pressing buttons on his remote control for the DVR or by using mouse clicks on his computer) that the user would like to create a program shortcut, the program shortcut component creates a shortcut object with the program information for "The Office" and stores the shortcut object to a menu readily accessible to the user. The program shortcut is added as a menu item to that menu.

In another embodiment, a user make create program shortcuts for programs that are being broadcast by creating a WishList (like for Poker-related programming) but not setting the Wishlist to auto-record the media content. In the Poker folder of Now Playing, program shortcuts are generated for all the upcoming shows that match the preference with automatic recordings of the shows not made. To record the program, the user may set one or more of the programs to record based upon the program shortcut, up until the time the program is to be broadcast. If the time of broadcast passes without the user selecting to record, the program shortcut is deleted.

Sharing Program Shorcuts

As an additional way to use program shortcuts, the DVR system illustrated in FIG. 1 allows users to share program shortcuts with users of other DVRs. Users may create networks with users of other DVRs in order to share media content. The networks may be private networks between the users or through the Internet. For example, in one embodiment, DVR system 100 might allow a user to identify other DVR users as "friends" and invite the other DVR users to access items in the user's Now Playing List. Thus, when a user is linked to other DVR users, the user may view, among other things, the other users' Now Playing Lists. In an embodiment, the user who is sharing shortcut may choose from a predefined list of reasons for sharing the shortcut. For example, the user may choose from choices such as, but not limited to, "It is my favorite show" or "It is like <name of another show>." The predefined list avoids the problem of making users type on the television.

In an embodiment, the user also has limited publishing rights to the other users' Now Playing List. In this way, the user may create program shortcuts for a second user that the second user may find interesting. The second user may also limit or prohibit other users from publishing program shortcuts on the second user's DVR. In one embodiment, a user may create a single shared folder where other users publish program shortcuts. This is a way to share data without using up large amounts of the other users' storage space. In one embodiment, a user has to be authenticated to the other system before they have access to any portion of the other user's DVR system.

Other Features of Program Shorcuts

In an embodiment, automatic program shortcuts may be generated for additional content of media content. For example, "extras" like broadband streamed minisodes, or behind-the-scenes featurettes that may be associated to a particular television show or movie based upon an identifier, may be generated if the user has recorded or scheduled to record the referenced television show or movie. The program shortcuts may be displayed in the Now Playing List group for that particular television show or movie to allow the user the option to later view the additional content.

In an embodiment, a specific piece of media content not currently available is requested up. When the media content does become available, a program shortcut is generated and appears. For example, a user might wish to view the movie "Duplicity," but the movie might not currently be available because the movie has not yet been released for home distribution or might simply not be available. When the movie does become available in any form, such as to record, download, or stream, a program shortcut is generated and the program shortcut appears for the user. In an embodiment, the request for the specific media content is in a "Not currently available" folder until the specific media content becomes available and a program shortcut is created.

In an embodiment, a user emails or text messages interesting content/articles to a DVR and the DVR may then determine media content to generate program shortcuts based on the keywords found in the article. For example, user might enjoy "NASCAR" and email or text an article regarding a "NASCAR" race to the DVR. The DVR might then determine that the user is interested in media content related to media content and generate program shortcuts to media content about races and other NASCAR events. In another example, a user might email a gossip article regarding the actor, "Tom Hanks". Based upon the keywords, "Tom Hanks," in the article, program shortcuts may be generated where Tom Hanks participates in some role in the content. This may be as an actor or a producer or any other role that Tom Hanks might play.

In another embodiment, a user may text message or email a specific piece of media content to a DVR and the DVR adds program shortcuts when the media content becomes available. The bookmark may appear in the Now Playing List. For example, if a user is interested in the movie "Wall-E", a trailer, a partial segment of, or some other media content might be sent by the user to the DVR that relates to the movie "Wall-E." The DVR may generate the program shortcut if the specific media content is already available or the DVR may need to wait until the media content becomes available and then create a program shortcut.

In yet another embodiment, a user may perform a search on the service provider's web site or other interface (mobile, telephone voice recognition, or email). When a user finds media content that he or she is interested, program shortcuts may be generated at the DVR from the website or other interface. This allows users who are not at home in a remote location, to generate program shortcuts of content. In addition, these searches may be performed at home, or the location of the DVR. Searching from a website might be much easier (without have to type on a television) for a user and he or she might prefer to search from the service provider's website rather than on the DVR itself. This allows additional interfaces on which to generate program shortcuts for the user.

Example DVR

Figure 25:
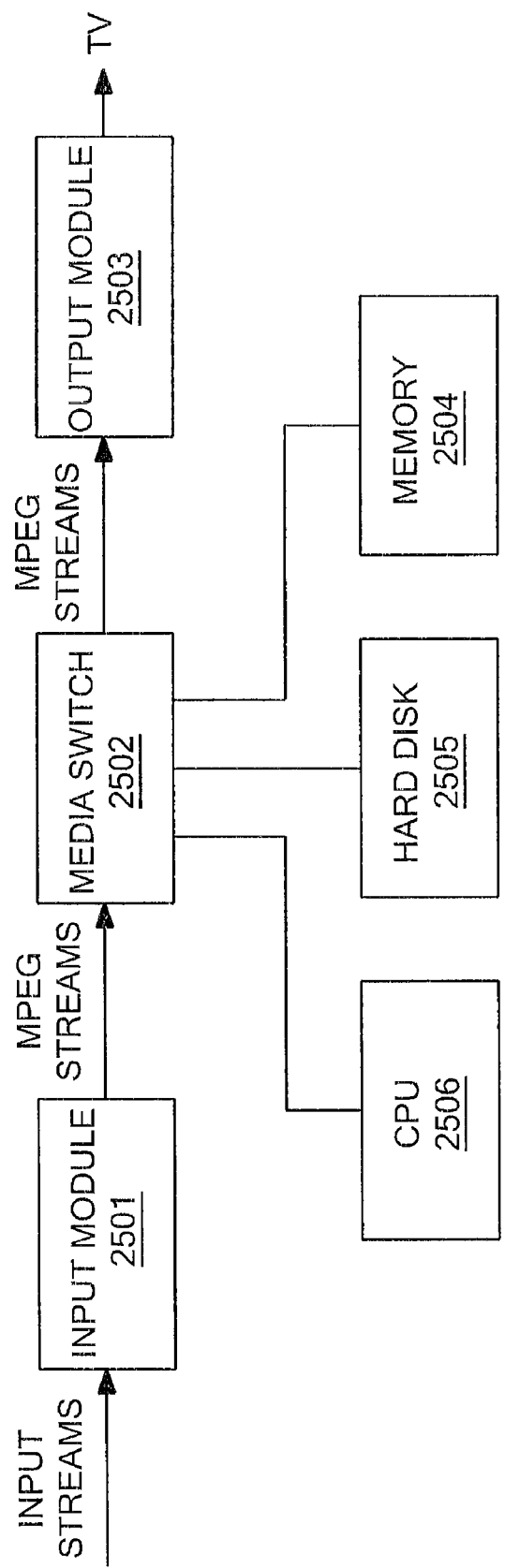
FIG. 25 is a block diagram that shows an example of the internal structure and operation of a DVR, according to an embodiment of the invention.

FIG. 25 is a block diagram that shows an example of the internal structure and operation of a DVR, according to an embodiment of the invention. An example of the internal structure and operation of a DVR is further described in U.S. Pat. No. 6,233,389, which is incorporated by reference as though originally disclosed herein.

The DVR shown in FIG. 25 comprises an input module 2501, a media switch 2502, and an output module 2503. Input module 2501 receives television (TV) input streams in any of a variety of forms. For example, a TV input stream received by input module 2501 may take the form of a National Television Standards Committee (NTSC) compliant signal or a PAL compliant broadcast signal. For another example, a TV input stream received by input module 2501 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment of the invention, input module 2501 produces MPEG streams. According to another embodiment of the invention, input module 2501 produces streams that are encoded using a different codec.

An MPEG-2 transport multiplex supports multiple programs in the same broadcast channel, which multiple video and audio feeds and private data. Input module 2501 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 2501 and passed to the other modules as if the signals had been delivered via an MPEG-2 private data channel.

Media switch 2502 mediates between a microprocessor CPU 2506, a hard disk or storage device 2505, and memory 2504. Input streams are converted to an MPEG stream and sent to media switch 2502. Media switch 2502 buffers the MPEG stream into memory 2504. Media switch 2502 then performs two operations if the DVR user is watching real-time TV: media switch 2502 sends the MPEG stream to output module 2503 and simultaneously writes the MPEG stream to hard disk or storage device 2505.

Output module 2503 receives MPEG streams as input and produces an analog TV signal according to NTSC, PAL, or other TV standards. Output module 2503 comprises an MPEG decoder, an on-screen display (OSD) generator, an analog TV encoder, and audio logic. The OSD generator allows the program logic to supply images which may be overlaid on top of the resulting TV analog signal. Additionally, output module 2503 can modulate information supplied by the program logic onto the VBI of the output signal in a number of standard formats, including NABTS, CC, and EDS.

Miscellaneous

According to an embodiment, a computer-implemented method comprises: receiving user command input that indicates a particular media content to which a user wishes to create a shortcut; generating a program shortcut object that comprises a reference to a process that allows retrieval of the particular media content; storing the shortcut object in a menu as a menu item; and, in response to receiving user command input indicating that the user has selected the particular program shortcut object, navigating to the process that allows retrieval of the particular media content that is referenced by the shortcut object; wherein the method is performed by one or more special-purpose computing devices.

In an embodiment, the process includes at least any one of: video on demand, downloading, and recording. In an embodiment, the method further comprises: analyzing media content that the user has viewed or recorded; identifying a type of media content that is of interest to a user based at least in part to the analysis of the media content; and automatically generating a shortcut object to media content that is similar to the type of media content identified.

In an embodiment, the method further comprises: receiving user command input that indicates a type of media content to which the user has an interest; and generating a program shortcut to media content based at least in part upon the type of media content identified by the user command input. In an embodiment, the particular media content includes any one of: video on demand, downloadable content, media content recommended by a recommending entity, or media content from third-party web sites. In an embodiment, the menu item to which the shortcut is stored is a menu item accessible by two or less user command input commands. In an embodiment, the method further comprises sharing shortcut objects with other users within a network.

In an embodiment, storing the shortcut object further comprises storing the shortcut object in a menu specified by a user command input. In an embodiment, storing the shortcut object further comprises storing the shortcut object in a menu based upon predetermined criteria. In an embodiment, the shortcut object remains stored only if the media content referenced by the shortcut object is available. In an embodiment, the shortcut object remains stored only until user command input is received that indicates the user wishes to remove the shortcut object. In an embodiment, the shortcut object is stored until an expiration date specified by the provider of media content referenced by the shortcut object.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 26:
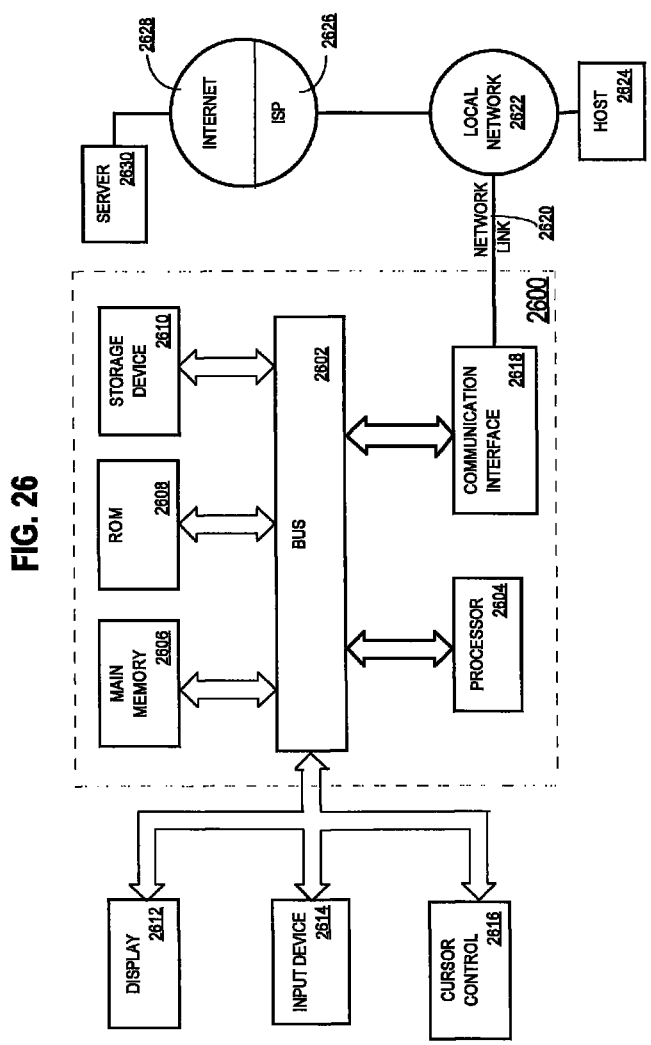
FIG. 26 is a block diagram of a system on which embodiments of the invention may be implemented.

For example, FIG. 26 is a block diagram that illustrates a computer system 2600 upon which an embodiment of the invention may be implemented. Computer system 2600 includes a bus 2602 or other communication mechanism for communicating information, and a hardware processor 2604 coupled with bus 2602 for processing information. Hardware processor 2604 may be, for example, a general purpose microprocessor.

Computer system 2600 also includes a main memory 2606, such as a random access memory (RAM) or other dynamic storage device, coupled to bus 2602 for storing information and instructions to be executed by processor 2604. Main memory 2606 also may be used for storing temporary variables or other intermediate information during execution of instructions to be executed by processor 2604. Such instructions, when stored in storage media accessible to processor 2604, render computer system 2600 into a special-purpose machine that is customized to perform the operations specified in the instructions.

Computer system 2600 further includes a read only memory (ROM) 2608 or other static storage device coupled to bus 2602 for storing static information and instructions for processor 2604. A storage device 2610, such as a magnetic disk or optical disk, is provided and coupled to bus 2602 for storing information and instructions.

Computer system 2600 may be coupled via bus 2602 to a display 2612, such as a cathode ray tube (CRT), for displaying information to a computer user. An input device 2614, including alphanumeric and other keys, is coupled to bus 2602 for communicating information and command selections to processor 2604. Another type of user input device is cursor control 2616, such as a mouse, a trackball, or cursor direction keys for communicating direction information and command selections to processor 2604 and for controlling cursor movement on display 2612. This input device typically has two degrees of freedom in two axes, a first axis (e.g., x) and a second axis (e.g., y), that allows the device to specify positions in a plane.

Computer system 2600 may implement the techniques described herein using customized hard-wired logic, one or more ASICs or FPGAs, firmware and/or program logic which in combination with the computer system causes or programs computer system 2600 to be a special-purpose machine. According to one embodiment, the techniques herein are performed by computer system 2600 in response to processor 2604 executing one or more sequences of one or more instructions contained in main memory 2606. Such instructions may be read into main memory 2606 from another storage medium, such as storage device 2610. Execution of the sequences of instructions contained in main memory 2606 causes processor 2604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 2610. Volatile media includes dynamic memory, such as main memory 2606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2602. Transmission media can also take the form of acoustic or light waves, such as those generated during radio-wave and infra-red data communications.

Various forms of media may be involved in carrying one or more sequences of one or more instructions to processor 2604 for execution. For example, the instructions may initially be carried on a magnetic disk or solid state drive of a remote computer. The remote computer can load the instructions into its dynamic memory and send the instructions over a telephone line using a modem. A modem local to computer system 2600 can receive the data on the telephone line and use an infra-red transmitter to convert the data to an infra-red signal. An infra-red detector can receive the data carried in the infra-red signal and appropriate circuitry can place the data on bus 2602. Bus 2602 carries the data to main memory 2606, from which processor 2604 retrieves and executes the instructions. The instructions received by main memory 2606 may optionally be stored on storage device 2610 either before or after execution by processor 2604.

Computer system 2600 also includes a communication interface 2618 coupled to bus 2602. Communication interface 2618 provides a two-way data communication coupling to a network link 2620 that is connected to a local network 2622. For example, communication interface 2618 may be an integrated services digital network (ISDN) card, cable modem, satellite modem, or a modem to provide a data communication connection to a corresponding type of telephone line. As another example, communication interface 2618 may be a local area network (LAN) card to provide a data communication connection to a compatible LAN. Wireless links may also be implemented. In any such implementation, communication interface 2618 sends and receives electrical, electromagnetic or optical signals that carry digital data streams representing various types of information.

Network link 2620 typically provides data communication through one or more networks to other data devices. For example, network link 2620 may provide a connection through local network 2622 to a host computer 2624 or to data equipment operated by an Internet Service Provider (ISP) 2626. ISP 2626 in turn provides data communication services through the world wide packet data communication network now commonly referred to as the "Internet" 2628. Local network 2622 and Internet 2628 both use electrical, electromagnetic or optical signals that carry digital data streams. The signals through the various networks and the signals on network link 2620 and through communication interface 2618, which carry the digital data to and from computer system 2600, are example forms of transmission media.

Computer system 2600 can send messages and receive data, including program code, through the network(s), network link 2620 and communication interface 2618. In the Internet example, a server 2630 might transmit a requested code for an application program through Internet 2628, ISP 2626, local network 2622 and communication interface 2618.

The received code may be executed by processor 2604 as it is received, and/or stored in storage device 2610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    identifying content in an email or text message directed to a set-top device;
    based on the content, identifying a video content item that is related to the content in the email or text message, wherein the video content item is different than the content in the email or text message;
    determining whether the video content item is available for access on the set-top device;
    in response to determining that the video content item is not available for access on the set-top box, refraining from generating a program shortcut object for the video content;
    in response to determining that the video content item is available for access on the set-top device, generating, a program shortcut object for the video content item, that initiates a content retrieval process for retrieval of the video content item, responsive to the email or text message;
    responsive to the email or text message directed to the set-top device comprising the content related to the video content item, the set-top device presenting, in a menu, a menu item corresponding to the video content item, the menu item based on the program shortcut object generated for the video content item; and
    in response to receiving user command input indicating that the user has selected the menu item from the menu, the set-top device executing the content retrieval process corresponding to the program shortcut object to reach a screen, and/or execute a method or routine, by which accessing, purchasing, and/or downloading the video content item occurs;
    presenting, at the set-top device, the retrieved video content item.

2. The method of claim 1, wherein the email or text message is a text message.

3. The method of claim 1, wherein the content in the email or text message comprises a news article.

4. The method of claim 1, wherein identifying the video content item comprises:
    identifying one or more keywords found in the content of the email or text message; and
    locating the video content item based on the one or more keywords.

5. The method of claim 1, wherein identifying the video content item comprises determining that the content in the email or text message is, or references, a trailer for, or partial segment of, the video content item.

6. The method of claim 1, wherein executing the content retrieval process includes at least one of: retrieving the video content item from a video on demand service, downloading the video content item, scheduling a recording of the video content item, purchasing rights to view the video content item, or receiving a stream of the video content item.

7. The method of claim 1, further comprising determining the menu in which to present the menu item based on one or more of: a specific menu specified by a user command input, or predetermined criteria.

8. The method of claim 1, further comprising sending the program shortcut object to additional set-top devices within a network.

9. The method of claim 1, further comprising, responsive to determining that the video content item, is no longer retrievable via the process, or to determining that an expiration date specified by the provider of the video content item, has been reached, deleting the program shortcut object.

10. The method of claim 1, wherein executing the content retrieval process comprises receiving the video content item from a web-based source, the method further comprising presenting, in the menu with the menu item, a plurality of menu items corresponding to content recorded by the set-top device.

11. The method of claim 1, wherein retrieving the video content item comprises receiving a transcoded stream of the video content item from a computing device, other than the set-top device, that has retrieved the video content item, wherein the computing device that has retrieved the video content item is connected to the set-top device via a local area network.

12. A system comprising:
a set-top device configured to display menus of media items and play particular media items selected from the menus, the set-top device comprising control circuitry configured to:
identify content in an email or text message directed to a set-top device;
identify a video content item related to the content in the email or text message directed to a set-top device, wherein the video content item is different than the content in the email or text message;
determine whether the video content item is available for access on the set-top device;
in response to determining that the video content item is not available for access on the set-top box, refrain from generating a program shortcut object for the video content;
in response to determining that the video content item is available for access on the set-top device generate, a program shortcut object for the video content item, that initiates a content retrieval process for retrieval of the video content item, responsive to the email or text message;
responsive to the email or text message directed to the set-top device comprising the content related to the video content item, present, in a menu, a menu item corresponding to the video content item, the menu item based on the program shortcut object generated for the video content item; and
the control circuitry is further configured to, in response to receiving user command input indicating that the user has selected the menu item from the menu, at the set-top device, execute the content retrieval process corresponding to the program shortcut object to reach a screen, and/or execute a method or routine, by which accessing, purchasing, and/or downloading the video content item occurs;
the control circuitry is further configured to present, at the set-top device, the retrieved video content item.

13. The system of claim 12, wherein the email or text message is a text message.

14. The system of claim 12, wherein the content in the email or text message comprises a news article.

15. The system of claim 12, wherein the control circuitry is further configured to identify the video content item is further configured to:
identify one or more keywords found in the content of the email or text message; and
locate the video content item based on the one or more keywords.

16. The system of claim 12, wherein the control circuitry is further configured to identify the video content item is further configured to determine that the content in the email or text message is, or references, a trailer for, or partial segment of, the video content item.

17. The system of claim 12, wherein the control circuitry is further configured to execute the content retrieval process is further configured to perform at least one of: retrieving the video content item from a video on demand service, downloading the video content item, scheduling a recording of the video content item, purchasing rights to view the video content item, or receiving a stream of the video content item.

18. The system of claim 12, wherein the control circuitry is further configured to determine the menu in which to present the menu item based on one or more of: a specific menu specified by a user command input, or predetermined criteria.

19. The system of claim 12, wherein the control circuitry is further configured to send the program shortcut object to additional set-top devices within a network.

20. The system of claim 12, wherein the control circuitry is further configured to, responsive to determining that the video content item is no longer retrievable via the process, or to determining that an expiration date specified by the provider of the video content item has been reached, delete the program shortcut object.

21. The system of claim 12, wherein the control circuitry is further configured to execute the content retrieval process is further configured to receive the video content item from a web-based source, the system further comprising logic configured to present, in the menu with the menu item, a plurality of menu items corresponding to content recorded by the set-top device.

22. The system of claim 12, wherein the control circuitry is further configured to retrieve the video content item comprises receiving a transcoded stream of the video content item from a computing device, other than the set-top device, that has retrieved the video content item, wherein the computing device that has retrieved the video content item is connected to the set-top device via a local area network.

23. A non-transitory computer-readable media having instructions encoded thereon for generating program shortcuts, the instructions comprising:
an instruction for identifying content in an email or text message directed to a set-top device;
an instruction for, based on the content, identifying a video content item that is related to the content in the email or text message, wherein the video content item is different than the content in the email or text message;
an instruction for determining whether the video content item is available for access on the set-top device;
an instruction for, in response to determining that the video content item is not available for access on the set-top box, refraining from generating a program shortcut object for the video content;
an instruction for, in response to determining that the video content item is available for access on the set-top device, generating, a program shortcut object for the video content item, that initiates a content retrieval process for retrieval of the video content item, responsive to the email or text message;

an instruction for responsive to the email or text message directed to the set-top device comprising the content related to the video content item, presenting, in a menu, a menu item corresponding to the video content item, the menu item based on the program shortcut object generated for the video content item; and an instruction for, in response to receiving user command input indicating that the user has selected the menu item from the menu, executing the content retrieval process corresponding to the program shortcut object to reach a screen, and/or execute a method or routine, by which accessing, purchasing, and/or downloading the video content item occurs;

an instruction for presenting, at the set-top device, the retrieved video content item.

* * * * *